US011589299B2

(12) United States Patent
Lee et al.

(10) Patent No.: US 11,589,299 B2
(45) Date of Patent: Feb. 21, 2023

(54) METHOD OF IMPLEMENTING SELF-ORGANIZING NETWORK FOR PLURALITY OF ACCESS NETWORK DEVICES AND ELECTRONIC DEVICE FOR PERFORMING THE SAME

(71) Applicant: SAMSUNG ELECTRONICS CO., LTD., Suwon-si (KR)

(72) Inventors: Taeseop Lee, Suwon-si (KR); Taejeoung Kim, Suwon-si (KR); Haksung Kim, Suwon-si (KR); Juhwan Song, Suwon-si (KR); Seowoo Jang, Suwon-si (KR); Minsuk Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 127 days.

(21) Appl. No.: 17/235,291

(22) Filed: Apr. 20, 2021

(65) Prior Publication Data
US 2022/0104113 A1 Mar. 31, 2022

(30) Foreign Application Priority Data
Sep. 28, 2020 (KR) .......................... 10-2020-0126359

(51) Int. Cl.
*H04W 48/18* (2009.01)
*G06N 20/00* (2019.01)
(Continued)

(52) U.S. Cl.
CPC ............ *H04W 48/18* (2013.01); *G06N 20/00* (2019.01); *H04W 24/02* (2013.01); *H04W 24/10* (2013.01)

(58) Field of Classification Search
CPC ............................... H04W 48/18; H04L 12/28
(Continued)

(56) References Cited

U.S. PATENT DOCUMENTS 9,357,403 B2 5/2016 Schmelz et al.
10,200,884 B2 2/2019 Tan et al.
(Continued)

FOREIGN PATENT DOCUMENTS

KR 10-2013-0096299 8/2013
WO 2019/001722 1/2019

OTHER PUBLICATIONS

International Search Report and Written Opinion dated Aug. 20, 2021 in corresponding International Application No. PCT/KR2021/005980.

*Primary Examiner* — Dang T Ton
(74) *Attorney, Agent, or Firm* — Nixon & Vanderhye, P.C.

(57) ABSTRACT

An electronic device configured to adjust a state of an access network including at least one cell may include: at least one processor, and a memory connected to the at least one processor, wherein the at least one processor is configured to control the electronic device to: obtain state history information of the access network at a first time point, determine, based on the obtained state history information, a first time period required to adjust a state of the access network, determine, based on the first time point and the first time period, a second time point, the second time point being a reference time point at which the state of the access network is to be adjusted, estimate a state of the access network at the second time point based on the obtained state history information, determine values of state control parameters for adjusting the state of the access network, based on the estimated state of the access network at the second time point, and transmit the determined values of the state control parameters to the access network, wherein the values of the state control parameters transmitted to the access network are applied, at the second time point, to the state control (Continued)

parameters of the access network, to adjust the state of the access network.

20 Claims, 10 Drawing Sheets

(51) Int. Cl.
*H04W 24/10* (2009.01)
*H04W 24/02* (2009.01)

(58) Field of Classification Search
USPC .......................................................... 370/329
See application file for complete search history.

(56) References Cited

U.S. PATENT DOCUMENTS

| | | |
|---|---|---|
| 2016/0205697 A1 | 7/2016 | Tan et al. |
| 2017/0310560 A1 | 10/2017 | Dribinski et al. |
| 2019/0149425 A1 | 5/2019 | Larish et al. |
| 2020/0007625 A1 | 1/2020 | Cook |
| 2020/0107259 A1 | 4/2020 | Allanki et al. |
| 2022/0104113 A1* | 3/2022 | Lee ...................... H04W 48/18 |

* cited by examiner

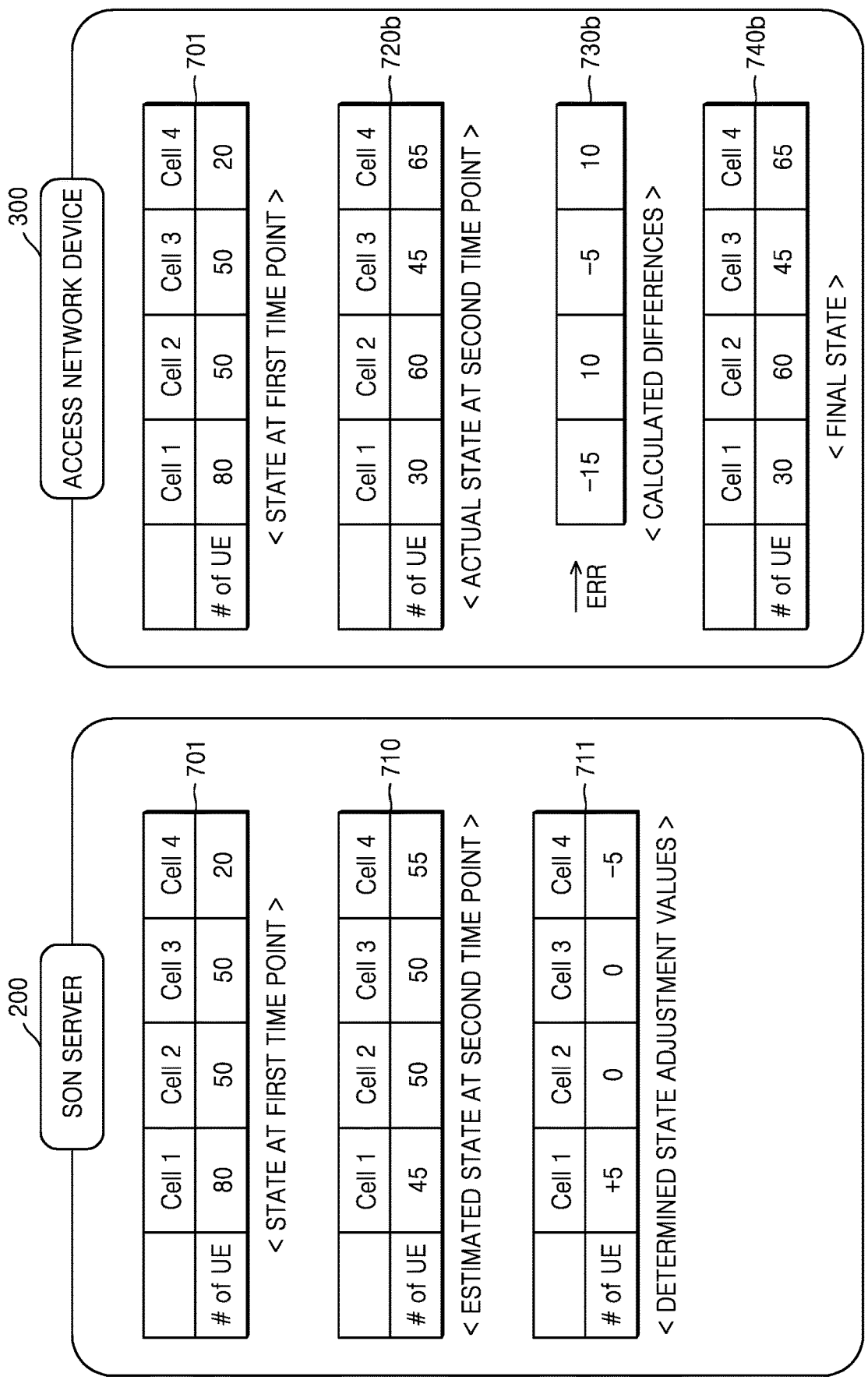

METHOD OF IMPLEMENTING SELF-ORGANIZING NETWORK FOR PLURALITY OF ACCESS NETWORK DEVICES AND ELECTRONIC DEVICE FOR PERFORMING THE SAME

CROSS-REFERENCE TO RELATED APPLICATION

This application is based on and claims priority under 35 U.S.C. § 119 to Korean Patent Application No. 10-2020-0126359, filed on Sep. 28, 2020, in the Korean Intellectual Property Office, the disclosure of which is incorporated by reference herein in its entirety.

BACKGROUND

1. Field

The disclosure relates to a method of implementing a self-organizing network for an access network device, and an electronic device for performing the same.

2. Description of Related Art

With the development of communication technologies, each of users may perform various types of operations by communicating with a base station using a user equipment (UE). For example, users may transmit and receive a voice message or a text message, reproduce a sound source or a video, or use the Internet, using their UEs.

A base station may establish an access network with a plurality of UEs in order to provide a radio communication service to the UEs. The base station, as an access network device, may include a plurality of sectors, and each sector may include a plurality of cells according to frequency bands. A plurality of UEs may be connected to each cell, and a radio communication service may be provided for each of the plurality of UEs.

A self-organizing network (SON) for an access network device may refer, for example, to a network capable of self-configuration considering its surrounding environment, and may be used for economically controlling a network coverage and increasing a transmission capacity, and for improving the economic utility in operation and management of networks. In order to implement the self-organizing network, a central server capable of collecting and analyzing data from a plurality of access network devices, and determining the optimal configuration may be required.

In implementation of a self-organizing network for a plurality of access network devices using a central server, a considerable amount of time may be required to collect and analyze necessary data from the plurality of access network devices. In this case, a considerable time difference may occur between a time point at which the data is collected from the access network devices and a time point at which the central server has determined the optimal configuration. Accordingly, the states of access networks at the time point at which the central server has determined the optimal configuration may differ greatly from the states of the access networks at the time point at which the data is collected, due to a number of changes made in the states. The optimal configuration determined by the central server may be inappropriate at a time point at which the optimal configuration is applied, and as a result, it may be difficult to effectively implement the self-organizing network.

SUMMARY

Embodiments of the disclosure provide a method of addressing the afore-described problem due to a time difference between a time point of collection of data from access network devices and a time point of determination of the optimal configuration, thereby effectively implementing a self-organizing network, and an electronic device for performing the same.

Additional aspects will be set forth in part in the description which follows and, in part, will be apparent from the description.

According to an example embodiment of the disclosure, a method, performed by an electronic device, of adjusting a state of an access network including at least one cell may include: obtaining state history information of the access network at a first time point, determining, based on the obtained state history information, a first time period required to adjust a state of the access network, determining, based on the first time point and the first time period, a second time point the second time point being a reference time point at which the state of the access network is to be adjusted, estimating a state of the access network at the second time point based on the obtained state history information, determining, based on the estimated state of the access network at the second time point, values of state control parameters for adjusting the state of the access network, and transmitting the determined values of the state control parameters to the access network, wherein the values of the state control parameters transmitted to the access network are to be applied, at the second time point, to the state control parameters of the access network, to adjust the state of the access network.

According to an example embodiment of the disclosure, an electronic device for adjusting a state of an access network including at least one cell may include: at least one processor, and a memory connected to the at least one processor, wherein the at least one processor may be configured to control the electronic device to: obtain state history information of the access network at a first time point, determine, based on the obtained state history information, a first time period required to adjust a state of the access network, determine, based on the first time point and the first time period, a second time point, the second time point being a reference time point at which the state of the access network is to be adjusted, estimate a state of the access network at the second time point based on the obtained state history information, determine values of state control parameters for adjusting the state of the access network, based on the estimated state of the access network at the second time point, and transmit the determined values of the state control parameters to the access network, wherein the values of the state control parameters transmitted to the access network are to be applied, at the second time point, to the state control parameters of the access network, to adjust the state of the access network.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIG. 7B is a diagram illustrating example adjustment of a state of an access network by a method of adjusting a state of an access network, according to various embodiments;

In relation to explanation of the drawings, similar reference numerals may be used for similar elements.

DETAILED DESCRIPTION

Figure 1:
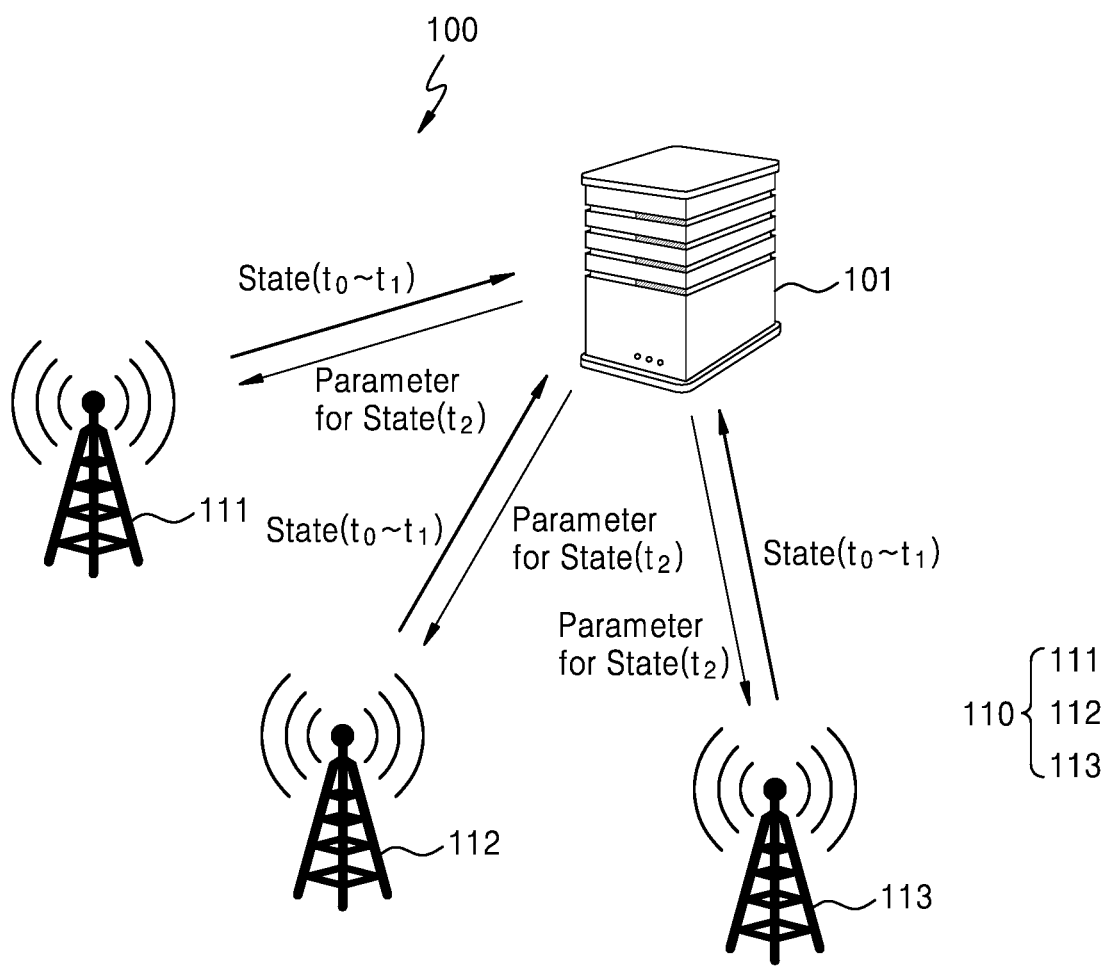
FIG. 1 is a diagram illustrating an example communication system including a plurality of access network devices, and a server for adjusting states of a plurality of access networks, according to various embodiments.

FIG. 1 is a diagram illustrating an example communication system 100 including a plurality of access network devices 110, and a server 101 for adjusting states of the plurality of access networks 110, according to various embodiments.

Referring to FIG. 1, the communication system 100 may include the server 101 and the plurality of access network devices 110, and the plurality of access network devices 110 may include a first access network device 111, a second access network device 112, and a third access network device 113. According to various embodiments of the disclosure, the number of access network devices connected to the server 101 is not limited to that illustrated in FIG. 1.

According to an embodiment of the disclosure, the server 101 may transmit and receive data to and from each of the plurality of access network devices 110. For example, the server 101 may receive information about a state of each of a plurality of access networks, from each of the plurality of access network devices 110, at a preset time point. For example, the server 101 may receive information about states of the plurality of access networks at time points from $t_0$ to $t_1$, from each of the plurality of access network devices 110. As another example, the server 101 may transmit, to each of the plurality of access network devices 110, information about values of parameters for adjusting a state of each of the plurality of access networks. For example, the server 101 may transmit, to each of the plurality of access network devices 110, information about values of the parameters for adjusting a state of each of the plurality of access networks at a time point $t_2$. In an embodiment of the disclosure, the time point $t_2$ may, for example, be temporally subsequent to the time point $t_1$, and the time point $t_1$ may, for example, be temporally subsequent to the time point $t_0$.

According to various embodiments of the disclosure, the server 101 may determine values of the parameters suitable for each of the plurality of access network devices 110 to perform adjustment with respect to a state of each of the plurality of access networks. For example, the first access network device 111 may adjust the state of the corresponding access network such that load balancing may be performed on a plurality of cells included in the first access network device 111, and, to this end, the server 101 may determine values of the parameters suitable for the load balancing to be performed on the plurality of cells, based on information about the state of the access network of the first access network device 111. As another example, the second access network device 112 may adjust the state of the corresponding access network to reduce power consumption, and, to this end, the server 101 may determine values of the parameters suitable to reduce the power consumption, based on information about the state of the access network of the second access network device 112.

According to various embodiments of the disclosure, each of the plurality of access network devices 110 may correspond, for example, to a base station, or may include, for example, and without limitation, a central unit (CU), a distributed unit (DU), a digital unit (DU), or a radio unit (RU), which include an element of a base station. According to an embodiment of the disclosure, each of the plurality of access network devices 110 may include a plurality of cells. For example, a sector, which is one regional unit of a base station, may include a plurality of cells according to frequency bands, and each of a plurality of UEs may be connected to any one selected from the plurality of cells.

According to various embodiments of the disclosure, the plurality of access network devices 110 may adjust states of the plurality of access networks, such that loads of the plurality of cells may be balanced with each other, or may adjust the states such that an amount of power consumed by the plurality of cells may be reduced. In various embodiments of the disclosure, the plurality of access network devices 110 may change the values of the parameters that are related to adjustment of the states of the plurality of access networks. For example, the plurality of access network devices 110 may receive, from the server 101, values of the parameters determined by the server 101, and may adjust the state of each of the plurality of access networks by changing the current values of the parameters to the received values.

According to an embodiment of the disclosure, each of the plurality of access network devices 110 may transmit, to the server 101, information about a state of the access network, at a preset time point or within a preset time period. For example, each of the plurality of access network devices 110 may transmit, to the server 101, information about a state of the access network, at every preset time interval. As another example, each of the plurality of access network devices 110 may transmit, to the server 101, information about a state of the access network, in response to a request message received from the server 101.

Figure 2:
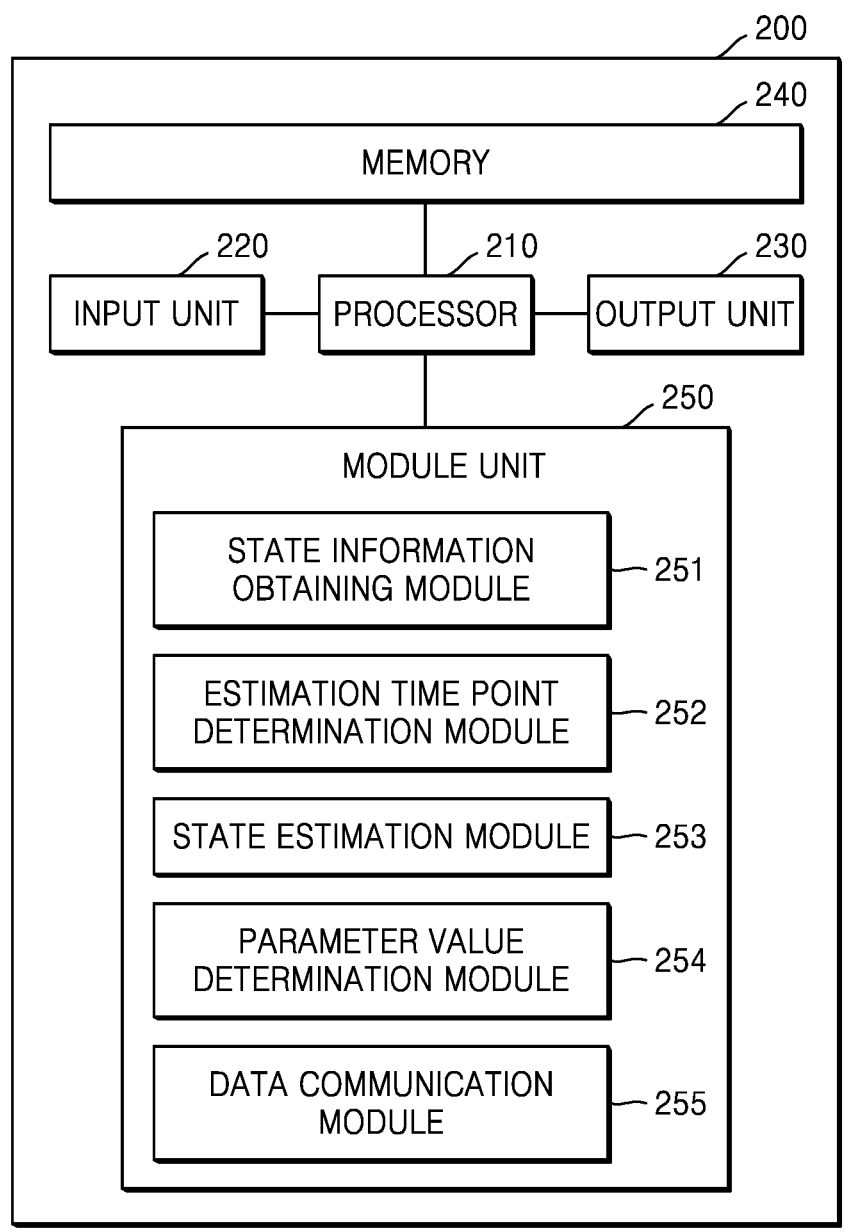
FIG. 2 is a block diagram illustrating an example electronic device for adjusting states of a plurality of access networks, according to various embodiments.

FIG. 2 is a block diagram illustrating an example electronic device for adjusting states of the plurality of access networks 110, according to various embodiments.

Referring to FIG. 2, an electronic device 200 may include a processor (e.g., including processing circuitry) 210, an input unit (e.g., including input circuitry) 220, an output unit (e.g., including output circuitry) 230, a memory 240, and a module unit (e.g., including various processing circuitry and/or executable program elements) 250 including a plurality of operable modules. According to various embodiments of the disclosure, a configuration of the electronic device 200 is not limited to that illustrated in FIG. 2, and may further include a configuration not illustrated in FIG. 2 or may omit a portion of the configuration illustrated in FIG. 2. For example, although FIG. 2 illustrates that all of the plurality of operable modules are included in the module unit 250, at least some of the plurality of modules may be implemented as software modules stored in the memory 240. For example, a state information obtaining module 251 may not be implemented as a separate hardware module included in the module unit 250 as illustrated in FIG. 2, but may be stored in the memory 240 as a software module, and may be executed by the processor 210 to operate. According to an embodiment of the disclosure, the electronic device 200 may be understood to have a configuration that is the same as or similar to that of the server 101 illustrated in FIG. 1.

The processor 210 may include various processing circuitry and be electrically connected to the components included in the electronic device 200, to perform calculation or data processing for control and/or communications of the components included in the electronic device 200. According to an embodiment of the disclosure, the processor 210 may load a command or data received from at least one of other components, into the memory 240, process the command or data, and store resulting data in the memory 240.

The input unit 220 and the output unit 230 may include various circuitry and be electrically connected to the processor 210 to configure an interface for transmitting or receiving data to or from another electronic device outside the electronic device 200, for example, each of the access network devices 110 illustrated in FIG. 1. According to an embodiment of the disclosure, the input unit 220 may include various input circuitry and receive, for example, information about a state of the access network received from the access network device through a data communication module 255, and the output unit 230 may include various output circuitry and output, for example, values of state control parameters to be transmitted to the access network device through the data communication module 255.

The memory 240 may be electrically connected to the processor 210, and may store commands or data related to operations of the components included in the electronic device 200. According to various embodiments of the disclosure, the memory 240 may store the information about the states of the access networks obtained using the state information obtaining module 251, the values of the state control parameters obtained using a parameter value determination module 254, or instructions for the operations above. According to an embodiment of the disclosure, in a case where at least some of the modules included in the module unit 250 are implemented as software to be executed by the processor 210, the memory 240 may store instructions for executing the at least some modules.

The module unit 250 may include a plurality of modules including various processing circuitry and/or executable program elements for implementing a plurality of operations executed by the electronic device 200. According to various embodiments of the disclosure, the module unit 250 may be understood as a hardware configuration for implementing at least some of the plurality of modules illustrated in FIG. 2, or as a configuration conceptually including a plurality of hardware units for implementing each module. According to various embodiments of the disclosure, the configuration of the module unit 250 is not limited to that illustrated in FIG. 2, and at least some of the plurality of modules included in the module unit 250 illustrated in FIG. 2 may be implemented as software to be stored in the memory 240.

The state information obtaining module 251 may include various processing circuitry and/or executable program elements and be executed by the processor 210 to obtain information about states of the access networks. According to an embodiment of the disclosure, the access network device may include at least one cell, and each cell may allocate radio resources to a plurality of user equipments (UEs) connected to the cell. In various embodiments of the disclosure, the radio resources may be understood as frequency resources for radio communications, which are limited resources that may be shared by only a limited number of users for a preset time period. In an embodiment of the disclosure, the radio resources may refer to a resource block (RB) in orthogonal frequency division multiplexing (OFDM) radio communication.

According to an embodiment of the disclosure, a state of the access network may be related to the allocation, by each cell included in the access network device, of the radio resources to the plurality of UEs. For example, a state of the access network may be related to at least one of, with respect to each of the at least one cell included in the access network device, the number of UEs currently connected to the cell, a physical resource block (PRB) utilization or usage, an internet protocol (IP) throughput, or a downlink (DL) data volume.

In an embodiment of the disclosure, the access network device may include four cells, and a state of the access network may indicate the number of UEs currently connected to a first cell, the number of UEs currently connected to a second cell, the number of UEs currently connected to a third cell, and the number of UEs currently connected to a fourth cell. In an embodiment of the disclosure, the access network device may include four cells, and a state of the access network may indicate a ratio of a total amount of available radio resources to be allocated by a first cell, to an amount of radio resources currently allocated to a plurality of UEs connected to the first cell, a ratio of a total amount of available radio resources to be allocated by a second cell, to an amount of radio resources currently allocated to a plurality of UEs connected to the second cell, a ratio of a total amount of available radio resources to be allocated by a third cell, to an amount of radio resources currently allocated to a plurality of UEs connected to the third cell, and a ratio of a total amount of available radio resources to be allocated by a fourth cell, to an amount of radio resources currently allocated to a plurality of UEs connected to the fourth cell. In an embodiment of the disclosure, similar to the above examples, the access network device may include four cells, and a state of the access network may indicate an IP throughput for a plurality of UEs connected to each cell, or a downlink data volume for each cell.

According to an embodiment of the disclosure, the electronic device 200 may be connected to a plurality of access network devices, and the state information obtaining module 251 may obtain information about a state of the corresponding access network with respect to each of the plurality of access network devices.

According to an embodiment of the disclosure, the state information obtaining module 251 may obtain information about a state of the access network at a time point of the obtaining. For example, the state information obtaining module 251 may obtain, at a first time point, information about a state of the access network at the first time point. According to an embodiment of the disclosure, the state information obtaining module 251 may obtain, at every preset time interval, information about a state of the access network at a time point of the obtaining. For example, the state information obtaining module 251 may obtain, at a first time point, information about a state of the access network at the first time point, and may obtain, at a second time point at which a preset time period elapses after the first time point, information about a state of the access network at the second time point.

According to an embodiment of the disclosure, the state information obtaining module 251 may obtain state history information of the access network at a first time point, which is a time point of the obtaining. The state history information may include, for example, information about a state of the access network at each of one or more time points within a preset time period temporally prior to the first time point, which is the time point of the obtaining. For example, the state history information may include only the state of the access network at the first time point, or may include the state of the access network at the first time, and a state of the access network at a time point that is temporally prior to the first time point by a preset time period. In various embodiments of the disclosure, the preset time period may be set to be a preset value, may be set by a user or an artificial intelligence learning model, or may be changed from a current value.

An estimation time point determination module 252 may include various processing circuitry and/or executable program elements and be executed by the processor 210 to determine a first time period required to adjust states of the access networks. According to various embodiments of the disclosure, the first time period may be a sum of at least one of a time period required to obtain information about states of the access networks from the access network devices, a time period required to collect the obtained information based on a reference time point, a time period required to estimate states of the access networks at a preset time, a time period required to determine values of the parameters for optimizing the states of the access networks, or a time period required to transmit the determined values of the parameters to the access network devices.

In an embodiment of the disclosure, the estimation time point determination module 252 may determine the first time period based on the state history information obtained at the first time point by the state information obtaining module 251. In an embodiment of the disclosure, the first time period may increase depending on an amount of the state history information. In various embodiments of the disclosure, the amount of the state history information may increase according to the number of access networks, may increase according to the number of cells included in each access network, or may increase according to the one or more time points included in the state history information. As the amount of the obtained state history information increases, a time period required to analyze and process the state history information may increase, and a time period required to determine the values of the parameters for adjusting the states of the access networks based on the state history information may also increase.

According to an embodiment of the disclosure, the estimation time point determination module 252 may compare the amount of the obtained state history information with a preset size, to determine the first time period required to adjust the states of the access networks. For example, information about an amount of normally obtained state history information, and information about a time period required corresponding to the amount may be input by a user. The estimation time point determination module 252 may compare the amount of the obtained state history information with the information input by the user, and then determine the first time period by calculating their ratio. As another example, a table of amounts of state history information and corresponding estimated first time periods may be prestored in the memory 240, and the estimation time point determination module 252 may determine the first time period by selecting, from the table, the amount most similar to the amount of the obtained state history information, and then retrieving the first time period corresponding to the selected amount. As another example, the estimation time point determination module 252 may determine the first time period using an artificial intelligence learning model. The artificial intelligence learning model may be trained using previously obtained state history information and time periods that have been actually taken to adjust states of the access networks, and may be used to determine the first time period.

According to an embodiment of the disclosure, the estimation time point determination module 252 may determine the first time period considering first time periods that have been previously determined under the same or similar conditions. For example, the estimation time point determination module 252 may determine the first time period to be one of the first time periods that have been previously determined, considering the same or similar conditions, such as the same or similar time zone, the same or similar day of the week, the same or similar season, the same or similar weather, the same or similar event, or the like. In various embodiments of the disclosure, the estimation time point determination module 252 may reduce the time period required to determine the first time period using past statistical data under the same or similar conditions, thereby reducing a load applied to the electronic device 200.

In an embodiment of the disclosure, the estimation time point determination module 252 may determine the first time period to be a first time period that has been determined at the same timeslot on a previous day. For example, an amount of state history information obtained at 1 PM today may be equal or similar to an amount of state history information obtained at 1 PM yesterday. Accordingly, the estimation time point determination module 252 may reduce the time period or a load required to determine the first time period by determining the first time period to be a first time period that has been determined at 1 PM yesterday.

In an embodiment of the disclosure, the estimation time point determination module 252 may determine the first time period to be a first time period that has been determined at the same time slot on the same day of the week in a previous week. For example, an amount of state history information obtained at 1 PM on a Saturday may be the same as or similar to an amount of state history information obtained at 1 PM on a previous Saturday. Accordingly, the estimation time point determination module 252 may reduce the time period or the load required to determine the first time period by determining the first time period to be a first time period that has been determined at 1:00 PM of the previous Saturday.

In an embodiment of the disclosure, the estimation time point determination module 252 may determine the first time period to be a first time period that has been determined at a time point at which the same or similar event occurred. For example, an amount of state history information obtained at a time point at which a concert, a festival, or a gathering is being held may be the same as or similar to an amount of state history information previously obtained at a time point at which a concert, a festival, or a gathering with the same or similar scale is being held. Accordingly, the estimation time point determination module 252 may reduce the time period or the load required to determine the first time period by determining the first time period to be a first time period that has been previously determined at a time point at which a concert, a festival, or a gathering with the same or similar scale is being held.

According to an embodiment of the disclosure, the estimation time point determination module 252 may determine the second time point, which is a reference time point at which the states of the access networks are to be adjusted, based on the first time point at which the state history information has been obtained, and the determined first time period. In an embodiment of the disclosure, the second time point may be temporally subsequent to a time point at which the first time period elapses after the first time point. For example, the second time point may be temporally subsequent to a time point at which the first time period and a time period spent on the determination of the first time period elapse after the first time point. According to various embodiments of the disclosure, because the first time period determined by the estimation time point determination module 252 may be different from a time period actually spent on the adjustment of the states of the access networks, the estimation time point determination module 252 may determine the second time point to be a time point at which both the first time period and a sufficient time period elapse after the first time point.

According to an embodiment of the disclosure, the estimation time point determination module 252 may first determine the second time point, which is the reference time point at which the states of the access networks are to be adjusted, and then determine, based on the second time point, the first time point at which the state history information is to be obtained, based on the second time point. In an embodiment of the disclosure, the estimation time point determination module 252 may determine the second time point based on a predefined plan. For example, the estimation time point determination module 252 may determine the second time point to be a preset time point such that states of the access networks are to be adjusted at the preset time point on a certain day of the week every week, or at the preset time point every day. As another example, the estimation time point determination module 252 may determine the second time point at every preset time interval such that states of the access networks are to be adjusted according to the preset time interval. As another example, the estimation time point determination module 252 may determine the second time point to be a time point at which a certain event, for example, an occasion or a gathering, is to be held, such that states of the access networks are to be adjusted at the time point of the certain event.

According to an embodiment of the disclosure, in a case where the second time point is determined prior to the determination of the first time point at which the state history information is to be obtained, the estimation time point determination module 252 may determine the first time point based on the determined second time point. For example, the estimation time point determination module 252 may determine the first time period considering first time periods that have been previously determined under the same or similar conditions, and may determine the first time point based on the second time point and the first time period. In an embodiment of the disclosure, the first time point may be temporally prior to a time point that is temporally prior to the second time point by the first time period. For example, the first time point may be temporally prior to a time point that is temporally prior to the second time point by a sum of the first time period and a time period spent on the determination of the first time period. According to various embodiments of the disclosure, because the first time period determined by the estimation time point determination module 252 may be different from the time period actually spent on the adjustment of the states of the access networks, the estimation time point determination module 252 may determine the first time point to be a time point that is temporally prior to, by a sufficient time period, a time point that is temporally prior to the second time point by the first time period.

A state estimation module 253 may include various processing circuitry and/or executable program elements and be executed by the processor 210 to estimate the states of the access networks at the second time point determined by the estimation time point determination module 252. According to an embodiment of the disclosure, the state estimation module 253 may estimate the states of the access networks at the second time point based on the state history information obtained at the first time point by the state information obtaining module 251, using a first artificial intelligence learning model. According to various embodiments of the disclosure, the state estimation module 253 may estimate states of the access networks at a plurality of time points within a preset time period. For example, the state estimation module 253 may estimate the states of the access networks at the plurality of time points including the second time point, within the preset time period. In an embodiment of the disclosure, the plurality of time points may include a time point that is temporally prior to the second time point by a preset time period, or a time point that is temporally subsequent to the second time point by the preset time period. The estimated states of the access networks at the plurality of time points may be compared with actual states of the access networks at the plurality of time points, to be used for training the first artificial intelligence learning model. For example, the estimated states at the plurality of time points may be compared with the actual states, and a plurality of feedbacks for the first artificial intelligence learning model may be obtained.

In an embodiment of the disclosure, the state estimation module 253 may use the state history information and a time difference between the first time point and the second time point, as an input to the first artificial intelligence learning model. The state estimation module 253 may estimate changes in the states of the access networks that may occur between the first time point and the second time point, using the first artificial intelligence learning model, and may obtain estimated states of the access networks at the second time point as an output of the first artificial intelligence learning model. In an embodiment of the disclosure, the first time point and the second time point may be used as the input to the first artificial intelligence learning model, instead of the time difference between the first time point and the second time point.

According to various embodiments of the disclosure, the states of the access networks may be changed according to time. For example, the number of UEs connected to each cell in the access network device may increase or decrease over time. Using the first artificial intelligence learning model, the state estimation module 253 may estimate the number of UEs connected to each cell at the second time point, based on a history of the number of UEs connected to each cell obtained from the first time point, and a lapse of time between the first time point and the second time point.

According to an embodiment of the disclosure, the state estimation module 253 may further use states of the access networks at at least one third time point between the first time point and the second time point, in the estimation of the states of the access networks at the second time point. For example, after obtaining the state history information at the first time point, the state information obtaining module 251 may further obtain the states of the access networks at the at least one third time point before the state estimation module 253 estimates the states of the access networks at the second time point. The state estimation module 253 may estimate the states of the access networks at the second time point using the state history information obtained at the first time point, and the obtained states of the access networks at the third time point. Accordingly, the state estimation module 253 may further improve the accuracy of the estimation of the states of the access networks at the second time point.

According to an embodiment of the disclosure, in the estimation of the states of the access networks at the second time point, the state estimation module 253 may further use the obtained states of the access networks at the at least one third time point between the first time point and the second time point, and values of the state control parameters at the third time point, that are determined by the parameter value determination module 254. For example, after obtaining the state history information at the first time point, the state information obtaining module 251 may further obtain the states of the access networks at the at least one third time point before the state estimation module 253 estimates the states of the access networks at the second time point. The parameter value determination module 254 may determine the values of the state control parameters for the adjustment of the states of the access networks, based on the obtained states of the access networks at the third time point. In an embodiment of the disclosure, the state estimation module 253 may estimate states of the access networks after the adjustment at the third time point, using the obtained states of the access networks at the third time point, and the determined values of the state control parameters at the third time point. According to an embodiment of the disclosure, the state estimation module 253 may estimate the states of the access networks at the second time point, using the state history information obtained at the first time point, and the states of the access networks after the adjustment at the third time point. Accordingly, the state estimation module 253 may further improve the accuracy of the estimation of the states of the access networks at the second time point.

According to an embodiment of the disclosure, in the estimation of the states of the access networks at the second time point, the state estimation module 253 may further use the estimated states of the access networks at the at least one third time point between the first time point and the second time point. For example, the state estimation module 253 may first estimate, at a time point temporally prior to the first time point, the states of the access networks at the third time point, separately from the estimation of the states of the access networks at the second time point. In an embodiment of the disclosure, the state estimation module 253 may estimate the states of the access networks at the second time point, using the state history information obtained at the first time point, and the estimated states of the access networks at the third time point. Accordingly, the state estimation module 253 may save a time period required to obtain, from the access network devices, the states of the access networks at the third time point, and may further improve the accuracy of the estimation of the states of the access networks at the second time point.

According to an embodiment of the disclosure, in the estimation of the states of the access networks at the second time point, the state estimation module 253 may further use the estimated states of the access networks at the at least one third time point between the first time point and the second time point, and the values of the state control parameters at the third time point, that are determined by the parameter value determination module 254. For example, the state estimation module 253 may first estimate, at a time point temporally prior to the first time point, the states of the access networks at the third time point, separately from the estimation of the states of the access networks at the second time point. The parameter value determination module 254 may determine the values of the state control parameters for the adjustment of the states of the access networks, based on the estimated states of the access networks at the third time point. In an embodiment of the disclosure, the state estimation module 253 may estimate the states of the access networks after the adjustment at the third time point, using the obtained states of the access networks at the third time point, and the determined values of the state control parameters at the third time point. According to an embodiment of the disclosure, the state estimation module 253 may estimate the states of the access networks at the second time point, using the state history information obtained at the first time point, and the states of the access networks after the adjustment at the third time point. Accordingly, the state estimation module 253 may save the time period required to obtain, from the access network devices, the states of the access networks at the third time point, and may further improve the accuracy of the estimation of the states of the access networks at the second time point.

According to various embodiments of the disclosure, the first artificial intelligence learning model used by the state estimation module 253 may be trained by, for example, and without limitation, at least one of reinforcement learning, supervised learning, machine learning, continual learning, federated learning, deep learning, or the like. In an embodiment of the disclosure, the first artificial intelligence learning model may be trained, for example, and without limitation, by supervised learning, and the state estimation module 253 may train the first artificial intelligence learning model using a scheme of supervised learning. For example, the state estimation module 253 may compare the estimated states of the access networks at the second time point, with actual states of the access networks at the second time point obtained by the state information obtaining module 251, and may train the first artificial intelligence learning model by providing, as feedbacks, differences between the estimated states and the actual states. The state estimation module 253 may estimate states of the access networks at various time points, using the first artificial intelligence learning model, and may repeat a process of comparing the estimated states with actual states obtained by the state information obtaining module 251. The state estimation module 253 may improve the accuracy of the first artificial intelligence learning model by repeating the process.

According to various embodiments of the disclosure, the state estimation module 253 may train the first artificial intelligence learning model using information about a history of states according to a certain condition of the access networks. For example, the state estimation module 253 may train the first artificial intelligence learning model, using a history of states of the access networks on a certain day of the week or at a certain time point. As another example, the state estimation module 253 may train the first artificial intelligence learning model, using a history of states of the access networks according to a certain event, for example, and without limitation, an occasion, a gathering, a public holiday, or the like.

According to various embodiments of the disclosure, the first artificial intelligence learning model may be implemented as a separate module, to be included in the module unit 250, stored in the memory 240, or included in another electronic device outside the electronic device 200, but is not limited thereto. For example, the first artificial intelligence learning model may be included in another electronic device outside the electronic device 200 that communicates with the data communication module 255 in a wired or wireless manner, or may be stored in a storage device outside the electronic device 200 that is connected to the electronic device 200 using various interfaces (e.g., USB) through the input unit 220 or the output unit 230.

The parameter value determination module 254 may include various processing circuitry and/or executable program elements and be executed by the processor 210 to determine the values of the state control parameters for adjusting the states of the access networks, based on the states of the access networks at the second time point that are estimated by the state estimation module 253. The state control parameters may be understood as including parameters that affect a state of the access network. For example, the state control parameters may adjust the state of the access network, by affecting, with respect to the plurality of cells included in the access network device, adjustment of a load being applied to the cell, or turning on or off of the cell. According to an embodiment of the disclosure, the state control parameters may include, for example, and without limitation, at least one of a reference signal received power (RSRP) threshold value, a reference signal received quality (RSRQ) threshold value, a physical resource block (PRB) proportion threshold value, a cell re-selection priority, or the like.

According to an embodiment of the disclosure, the RSRP threshold value or the RSRQ threshold value may affect adjustment of a cell coverage of the cell. For example, with respect to a first cell among the plurality of cells, as the RSRP threshold value or the RSRQ threshold value increases, a cell coverage of the first cell may decrease, whereas, as the RSRP threshold value or the RSRQ threshold value decreases, the cell coverage of the first cell may increase. As the cell coverage of the first cell increases, the number of UEs connected to the first cell may also increase, whereas, as the cell coverage of the first cell decreases, the number of UEs connected to the first cell may also decrease.

According to an embodiment of the disclosure, the PRB proportion threshold value may affect determination of on or off of the cell, or on or off of power amplifiers of the access network devices 110. In an embodiment of the disclosure, in a case where a proportion of radio resources allocated, by a cell, to UEs connected to the cell is less than the PRB proportion threshold value, the cell, or the power amplifiers of the access network devices 110 may be set to be turned off. In an embodiment of the disclosure, in a case where the proportion of the radio resources allocated by the first cell among the plurality of cells is a certain value, and the PRB proportion threshold value for the first cell is set to be greater than the certain value, the first cell may be turned off.

According to an embodiment of the disclosure, the cell re-selection priority may affect the number of UEs connected to the cell. For example, as a value of the cell re-selection priority for the first cell among the plurality of cells increases, the number of UEs connected to the first cell may also increase. As another example, as the value of the cell re-selection priority for the first cell decreases, the number of UEs connected to the first cell may also decrease.

According to an embodiment of the disclosure, the values of the state control parameters may be determined between the first time point at which the state information obtaining module 251 obtains the state information history of the access networks, and the second time point determined by the estimation time point determination module 252 to be the reference time point at which the states of the access networks are to be adjusted.

According to various embodiments of the disclosure, the values of the state control parameters may be determined depending on a purpose of the adjustment of the states of the access networks. For example, the values of the state control parameters may be determined for the purpose of load balancing for each of at least one cell included in the access network device. In an embodiment of the disclosure, the values of the state control parameters may be determined such that, for the at least one cell included in the access network device, the numbers of UEs currently connected to the cells, or proportions of radio resources allocated by the cells are to be uniform. In an embodiment of the disclosure, the values of the state control parameters may be determined such that, for the at least one cell included in the access network device, IP throughputs or downlink data volumes are to be uniform by adjusting the numbers of UEs connected to the cells. In various embodiments of the disclosure, it may be understood that the load balancing for each of the at least one cell is to adjust a state of the access network to reduce a standard deviation of states of the cells.

As another example, the values of the state control parameters may be determined for the purpose of adjusting power consumption for the at least one cell included in the access network device. In an embodiment of the disclosure, the values of the state control parameters may adjust the state of the access network to reduce power consumed by all of the at least one cell. For example, in a case where the number of UEs currently connected to the at least one cell is less than a preset level, and a total power consumption may be reduced, the values of the state control parameters may be determined such that the UEs currently connected to the at least cell are to be connected to another cell, and the at least one cell or the power amplifiers of the access network devices 110 are to be turned off. For example, in a case where a proportion of radio resources allocated by the at least one cell is less than a preset level, and a total power consumption may be reduced, the values of the state control parameters may be determined such that allocation of radio resources for UEs connected to the at least one cell is to be performed by another cell, and the at least one cell or the power amplifiers of the access network devices 110 are to be turned off.

According to an embodiment of the disclosure, the parameter value determination module 254 may determine a parameter value application time period as well as the values of the state control parameters. The parameter value application time period may be understood as, for example, a shortest time period required for the determined values of the state control parameters to be applied to the access networks, or a shortest time period required for the determined values of the state control parameters to be applied to the access networks without any further update. In an embodiment of the disclosure, the parameter value determination module 254 may determine the parameter value application time period based on the states of the access networks at the second time point that are estimated by the state estimation module 253. In an embodiment of the disclosure, the parameter value determination module 254 may determine the parameter value application time period based on the state history information obtained by the state information obtaining module 251.

In an embodiment of the disclosure, the determined values of the state control parameters and the determined parameter value application time period may be transmitted to the access network devices 110. In an embodiment of the disclosure, the parameter value determination module 254 may not determine new values of the state control parameters until the determined parameter value application time period elapses after the second time point. In an embodiment of the disclosure, in a case where the electronic device 200 receives a message for requesting new values of the new state control parameters from the access network devices 110, the parameter value determination module 254 may determine the new values of the state control parameters, even before the determined parameter value application time period elapses after the second time point. In an embodiment of the disclosure, in a case where the state estimation module 253 has estimated states of the access networks at a new time point, according to a preset plan or occurrence of a new event, the parameter value determination module 254 may determine new values of the state control parameters, even before the determined parameter value application time period elapses after the second time point.

According to an embodiment of the disclosure, the parameter value determination module 254 may determine the values of the state control parameters for adjusting the states of the access networks, using a second artificial intelligence learning model, based on the states of the access networks at the second time point estimated by the state estimation module 253. According to an embodiment of the disclosure, the parameter value determination module 254 may use the estimated states of the access networks at the second time point as an input to the second artificial intelligence learning model. The parameter value determination module 254 may estimate and determine, using the second artificial intelligence learning model, a combination of values of the state control parameters for achieving the purpose of adjustment of states of the access networks, considering the purpose, for example, load balancing, power consumption adjustment, or the like.

According to various embodiments of the disclosure, the second artificial intelligence learning model used by the parameter value determination module 254 may be trained, for example, and without limitation, by at least one of reinforcement learning, supervised learning, machine learning, continual learning, federated learning, deep learning, or the like. In an embodiment of the disclosure, the second artificial intelligence learning model may be trained by reinforcement learning, and the parameter value determination module 254 may train the second artificial intelligence learning model using a scheme of reinforcement learning. For example, the parameter value determination module 254 may calculate a value of a reward variable using, as a state variable for a reinforcement learning model, the states of the access networks at the first time point obtained by the state information obtaining module 251, using, as an action variable for the reinforcement learning model, values of the state control parameters output by the second artificial intelligence learning model, and then obtaining, using the state information obtaining module 251, states of the access networks to which the determined values of the state control parameters have been applied. The parameter value determination module 254 may train the second artificial intelligence learning model by repeating the above-described operation at various time points.

According to various embodiments of the disclosure, the second artificial intelligence learning model may be implemented as a separate module, to be included in the module unit 250, stored in the memory 240, or included in another electronic device outside the electronic device 200. For example, the second artificial intelligence learning model may be included in another electronic device outside the electronic device 200 that communicates with the data communication module 255 in a wired or wireless manner, or may be stored in a storage device outside the electronic device 200 that is connected to the electronic device 200 using various interfaces (e.g., USB) through the input unit 220 or the output unit 230.

The data communication module 255 may include various processing circuitry and/or executable program elements and be executed by the processor 210 to transmit or receive data to or from other electronic devices outside the electronic device 200. For example, the data communication module 255 may receive information about states of the plurality of access networks from the plurality of access network devices. As another example, the data communication module 255 may transmit information about values of the state control parameters for adjusting states of the plurality of access networks with respect to the plurality of access network devices.

Figure 3:
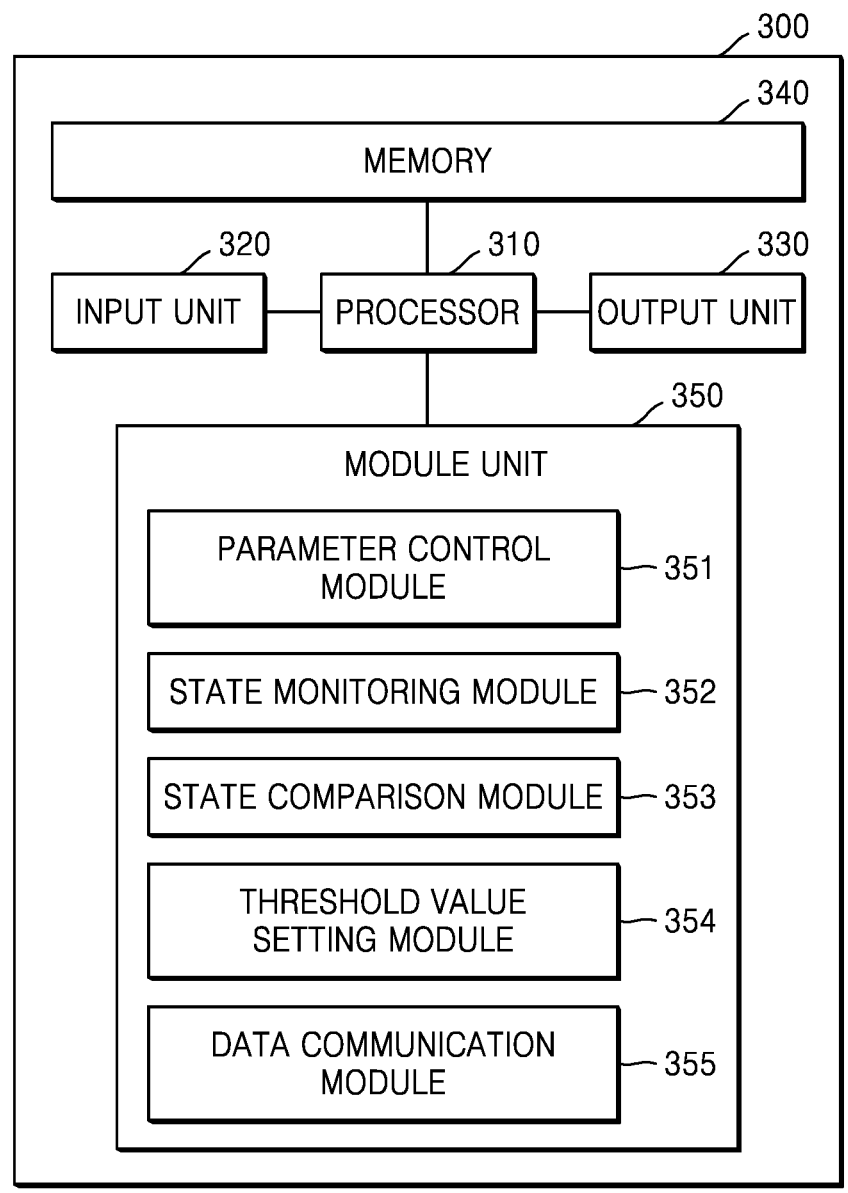
FIG. 3 is a block diagram illustrating an example access network device, according to various embodiments.

FIG. 3 is a block diagram illustrating an example access network device, according to various embodiments.

Referring to FIG. 3, an access network device 300 may include a processor (e.g., including processing circuitry) 310, an input unit (e.g., including input circuitry) 320, an output unit (e.g., including output circuitry) 330, a memory 340, and a module unit (e.g., including processing circuitry and/or executable program elements) 350 including a plurality of operable modules. According to various embodiments of the disclosure, a configuration of the access network device 300 is not limited to that illustrated in FIG. 3, and may further include a configuration not illustrated in FIG. 3, or may omit a portion of the configuration illustrated in FIG. 3. For example, although FIG. 3 illustrates that all of the plurality of operable modules are included in the module unit 350, at least some of the plurality of modules may be implemented as software modules stored in the memory 340. For example, a parameter control module 351 may not be implemented as a separate hardware module included in the module unit 350 as illustrated in FIG. 3, but may be stored in the memory 340 as a software module, and may be executed by the processor 310 to operate.

According to an embodiment of the disclosure, the access network device 300 may be understood to have a configuration that is the same as or similar to that of the first, second, and third access network devices 111, 112, and 113 illustrated in FIG. 1, and may be understood to be electrically connected to the electronic device 200 illustrated in FIG. 2. According to an embodiment of the disclosure, the access network device 300 may include at least one cell, and each cell may be coupled to one or more UEs to respond to a request from the one or more UEs, and to allocate radio resources for the one or more UEs. The descriptions of the processor 210, the input unit 220, the output unit 230, and the module unit 250 of FIG. 2 may be identically or similarly applicable to the processor 310, the input unit 320, the output unit 330, and the module unit 350.

The parameter control module 351 may include various processing circuitry and/or executable program elements and be executed by the processor 310 to change values of the state control parameters to adjust a state of an access network. For example, the parameter control module 351 may change the values of the state control parameters by applying, to the state control parameters, values received from a server (e.g., the electronic device 200 of FIG. 2) through a data communication module 355.

According to an embodiment of the disclosure, the parameter control module 351 may change the values of the state control parameters based on a certain condition. For example, the parameter control module 351 may change the values of the state control parameters based on a result of comparing, by a state comparison module 353, an estimated state with an actual state of the access network. In an embodiment of the disclosure, in a case where the state comparison module 353 has determined that a difference between the estimated state and the actual state is less than a preset level, the parameter control module 351 may change the values of the state control parameters to the values received from the server. In an embodiment of the disclosure, in a case where the state comparison module 353 has determined that the difference between the estimated state and the actual state is greater than or equal to a preset level, the parameter control module 351 may maintain the values of the state control parameters without changing the values of the state control parameters to the values received from the server.

A state monitoring module 352 may include various processing circuitry and/or executable program elements and be executed by the processor 310 to monitor a state of the access network and obtain a state of the access network at a preset time point. A state of the access network may be related, for example, and without limitation, to at least one of, with respect to each of the at least one cell included in the access network device 300, the number of UEs currently connected to the cell, a physical resource block (PRB) utilization or usage, an internet protocol (IP) throughput, a downlink (DL) data volume, or the like.

According to an embodiment of the disclosure, the state monitoring module 352 may obtain information about a state of the access network, at every preset time interval. For example, the state monitoring module 352 may obtain information about a state of the access network, at every preset time interval within a preset time period, and may store state history information for the preset time period in the memory 340 using the obtained information. According to an embodiment of the disclosure, the state monitoring module 352 may obtain information about a state of the access network based on a request received from the server. According to an embodiment of the disclosure, the state monitoring module 352 may obtain information about a state of the access network based on a request of another module included in the access network device 300. For example, the state monitoring module 352 may obtain information about a state of the access network based on a request of the parameter control module 351 or the state comparison module 353.

The state comparison module 353 may include various processing circuitry and/or executable program elements and be executed by the processor 310 to compare an estimated state of the access network at a preset time point, with an actual state of the access network at the preset time point. According to an embodiment of the disclosure, the estimated state may be based on information obtained from the server. According to an embodiment of the disclosure, the actual state may be obtained by the state monitoring module 352.

According to an embodiment of the disclosure, the state comparison module 353 may indicate a difference between the estimated state and the actual state using a separate parameter. For example, the state comparison module 353 may generate a vector indicating the difference between the estimated state and the actual state. In an embodiment of the disclosure, in a case where the access network device 300 includes four cells, and a number of UEs currently connected to each cell is used to indicate a state of each of the four cells, the vector may include four elements each indicating a difference between an estimated number of UEs currently connected to each cell and an actual number of UEs currently connected to each cell. In an embodiment of the disclosure, in a case where the access network device 300 includes four cells, and a number of UEs currently connected to each cell and an IP throughput in each cell are used to indicate a state of each of the four cells, the vector may include eight elements indicating differences between estimated numbers of UEs currently connected to the cells and actual numbers of UEs currently connected to the cells, and differences between estimated IP throughputs in the cells and actual IP throughputs in the cells. In various embodiments of the disclosure, the number of elements of the vector may depend on the number of cells included in the access network device 300 and the number of variables indicating a state of the access network. According to an embodiment of the disclosure, the state comparison module 353 may transform the elements of the vector into a magnitude, and compare the magnitude with a threshold value. For example, the state comparison module 353 may calculate a mean square or a root mean square of the elements of the vector, and may compare the calculated value with the threshold value to determine whether the difference between the estimated state and the actual state is less than a preset level.

According to an embodiment of the disclosure, the state comparison module 353 may transmit, to the parameter control module 351, a result of comparing the estimated state with the actual state. For example, the state comparison module 353 may transmit, to the parameter control module 351, the result of comparing the difference between the estimated state and the actual state, with the threshold value.

A threshold value setting module 354 may include various processing circuitry and/or executable program elements and be executed by the processor 310 to set a threshold value used by the state comparison module 353. For example, the threshold value may be set to be a value predefined by the user. As another example, the threshold value may be set based on the stability or a load level of the access network. For example, in a case where the threshold value is relatively high, the frequency at which the values of the state control parameters are changed may be relatively high, and this may affect the stability or the load level of the access network. On the other hand, in a case where the threshold value is relatively low, the frequency at which the values of the state control parameters are changed may be relatively low, and this may result in a lack of appropriate adjustment. As another example, the threshold value may be set using a separate artificial intelligence learning model.

The data communication module 355 may include various processing circuitry and/or executable program elements and be executed by the processor 310 to transmit or receive data to or from electronic devices (e.g., the electronic device 200 of FIG. 2) outside the access network device 300. For example, the data communication module 355 may transmit, to the server, information about a state of the access network. As another example, the data communication module 355 may receive, from the server, information about values of the state control parameters for adjusting a state of the access network.

Figure 4:
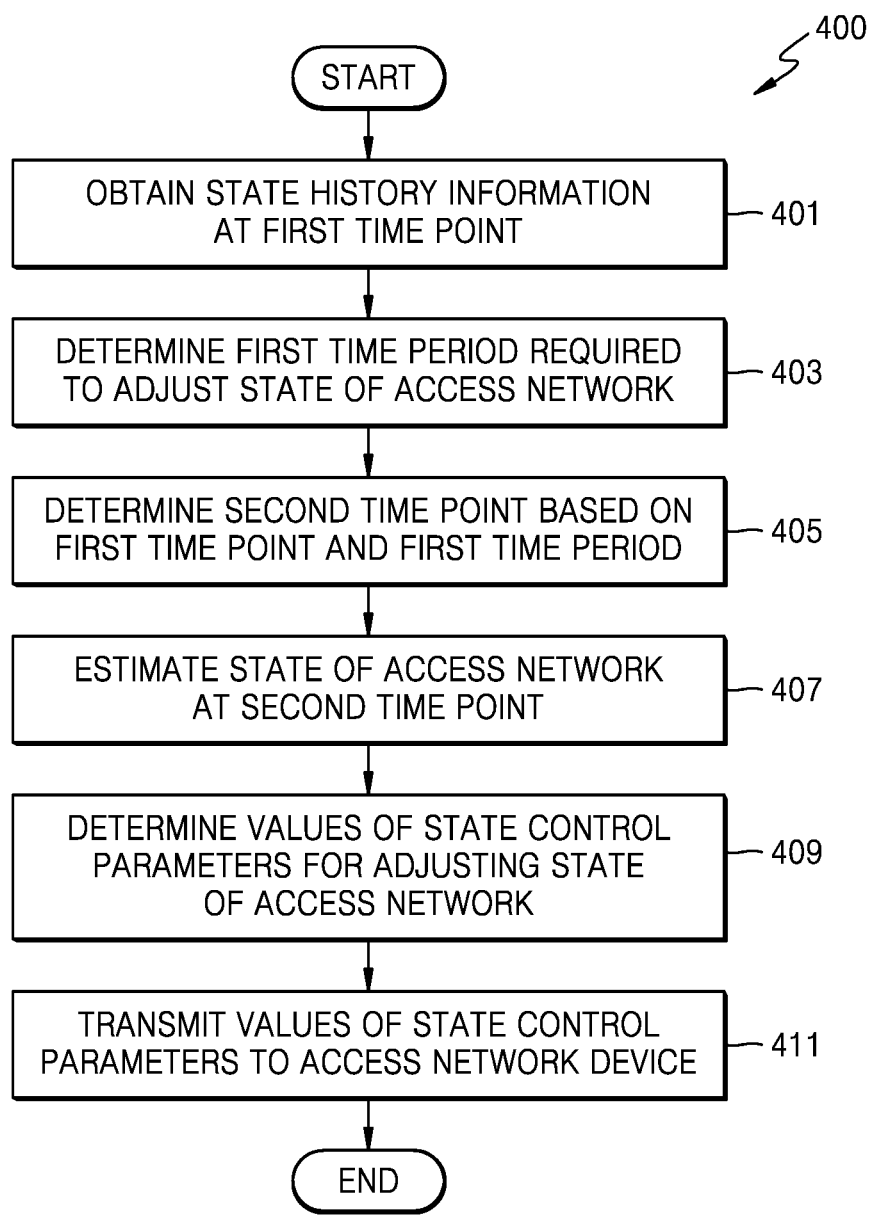
FIG. 4 is a flowchart illustrating an example method of adjusting a state of an access network, according to various embodiments.

FIG. 4 is a flowchart illustrating an example method of adjusting a state of an access network, according to various embodiments.

Referring to FIG. 4, a method, performed by an electronic device e.g., the electronic device 200 of FIG. 2), of adjusting a state of an access network according to an embodiment of the disclosure may include operations 401 to 411. In an embodiment of the disclosure, operations 401 to 411 may be performed by a processor (e.g., the processor 210 of FIG. 2) of the electronic device. According to various embodiments of the disclosure, the method, performed by an electronic device, of adjusting a state of an access network is not limited to that illustrated in FIG. 4, and may further include operations not illustrated in FIG. 4 or omit at least one of the operations illustrated in FIG. 4.

In operation 401, the electronic device may obtain state history information from an access network device (e.g., the access network device 300 of FIG. 3) at a first time point. The state history information may include, for example, information about a state of the access network at each of one or more time points within a preset time period temporally prior to the first time point. The information about a state of the access network may be related, for example, and without limitation, to at least one of, with respect to at least one cell included in the access network device, a number of UEs currently connected to the cell, a physical resource block (PRB) utilization or usage, an internet protocol (IP) throughput, a downlink (DL) data volume, or the like.

In operation 403, the electronic device may determine a first time period required to adjust a state of the access network. According to various embodiments of the disclosure, the first time period may be a sum of at least one of a time period required to obtain information about a state of the access network from the access network device, a time period required to collect the obtained information based on a reference time point, a time period required to estimate a state of the access network at a preset time point, a time period required to determine values of parameters for optimizing the state of the access network, or a time period required to transmit the determined values of the parameters to the access network device.

In operation 405, the electronic device may determine a second time point based on the first time point and the first time period. The second time point may be understood as a reference time point at which the state of the access network is to be adjusted. In an embodiment of the disclosure, the second time point may be temporally subsequent to a time point at which the first time period elapses after the first time point. For example, the second time point may be temporally subsequent to a time point at which the first time period and a time period spent on the determination of the first time period elapse after the first time point.

In operation 407, the electronic device may estimate a state of the access network at the second time point. According to an embodiment of the disclosure, the electronic device may estimate the state of the access network at the second time point, based on the state history information obtained in operation 401, and a first artificial intelligence learning model. For example, the first artificial intelligence learning model may include an artificial intelligence model for estimating a state of the access network at a time point at which a preset time period elapses, and state history information for the access network may be input to the first artificial intelligence learning model. In an embodiment of the disclosure, information about the first time point and information about the second time point may be input to the first artificial intelligence learning model, to input the preset time period. In an embodiment of the disclosure, information about a temporal difference between the first time point and the second time point may be input to the first artificial intelligence learning model, to input the preset time period.

In operation 409, the electronic device may determine values of the state control parameters for adjusting the state of the access network, based on the state of the access network at the second time point estimated in operation 407. According to various embodiments of the disclosure, the electronic device may determine the values of the state control parameters for the purpose of load balancing on a plurality of cells or for the purpose of adjustment of power consumed by the plurality of cells, with respect to the estimated state of the access network at the second time point. For example, and without limitation, the electronic device may determine an RSRP threshold value, an RSRQ threshold value, or a cell re-selection priority, with respect to a certain cell, to distribute loads being applied to the plurality of cells. As another example, the electronic device may determine a PRB proportion threshold value for a certain cell, to adjust the power consumed by the plurality of cells.

According to an embodiment of the disclosure, the values of the state control parameters may be determined based on the estimated state of the access network at the second time point, and a second artificial intelligence learning model. For example, the second artificial intelligence learning model may include an artificial intelligence model for determining values of the state control parameters suitable for load balancing or power consumption adjustment with respect to a certain state of the access network. According to an embodiment of the disclosure, the second artificial intelligence learning model may receive, as an input, the estimated state of the access network at the second time point, to determine values of the state control parameters for maximizing a reward, for example, for maximizing an amount of loads distributed by load balancing or an amount of reduced power, in a resulting state of the access network to which the adjustment has been applied.

In operation 411, the electronic device may transmit, to the access network device, the values of the state control parameters determined in operation 409. The values of the state control parameters may be transmitted to the access network device to be applied to the plurality of cells included in the access network device, and the state of the access network may be adjusted.

Figure 5:
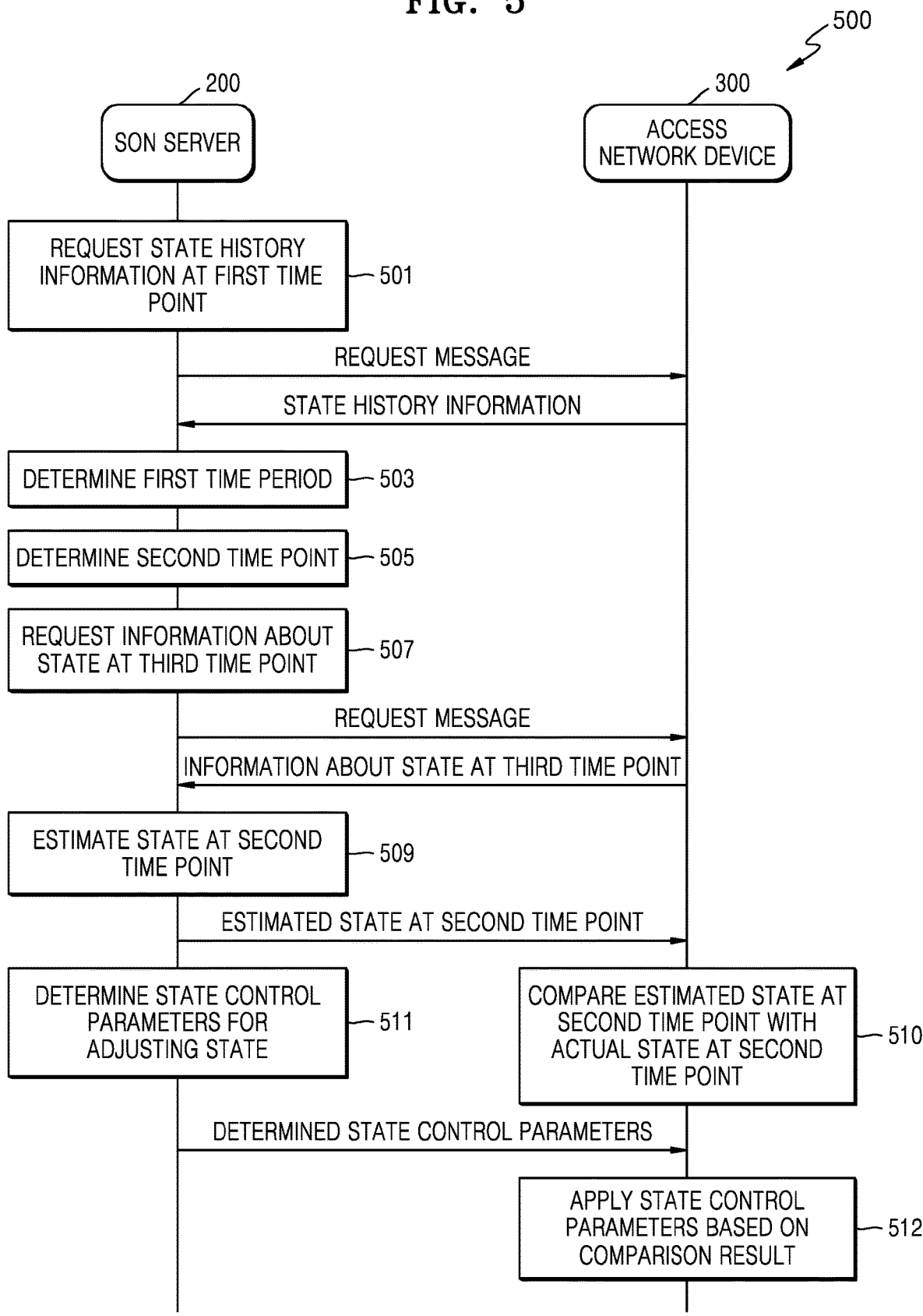
FIG. 5 is a signal flow diagram illustrating example operations of electronic devices for adjusting a state of an access network, according to various embodiments.

FIG. 5 is a signal flow diagram illustrating example operations of electronic devices for adjusting a state of an access network, according to various embodiments.

Referring to FIG. 5, a method of adjusting a state of an access network by electronic devices (e.g., the electronic device 200 of FIG. 2 and the access network device 300 of FIG. 3) according to an embodiment of the disclosure may include operations 501 to 512. According to an embodiment of the disclosure, a SON (self-organizing network) server 200 illustrated in FIG. 5 may be the electronic device 200 illustrated in FIG. 2. According to an embodiment of the disclosure, operations 501 and 512 may be performed by processors (e.g., the processor 210 of FIG. 2 or the processor 310 of FIG. 3) of the electronic devices. According to various embodiments of the disclosure, the method of adjusting a state of an access network by electronic devices is not limited to that illustrated in FIG. 5, and may further include operations not illustrated in FIG. 5 or omit at least one of the operations illustrated in FIG. 5.

In operation 501, the SON server 200 may request the access network device 300 to provide state history information at a first time point. In an embodiment of the disclosure, a request message may be transmitted from the SON server 200 to the access network device 300, and the access network device 300 may transmit the state history information at the first time point to the SON server 200 in response to the request message. According to an embodiment of the disclosure, the access network device 300 may store, in a memory, a state of the access network at every preset time interval, and may generate the state history information based on the states of the access network at a preset number of time points. According to various embodiments of the disclosure, the access network device 300 may generate or update the state history information periodically according to a preset time interval, or may generate the state history information in response to a request message from the SON server 200. According to an embodiment of the disclosure, operation 501 may be omitted. For example, the SON server 200 may not request the access network device 300 to provide the state history information, and the access network device 300 may periodically transmit the state history information to the SON server 200 regardless of a request message.

In operation 503, the SON server 200 may determine a first time period required to adjust a state of the access network. In an embodiment of the disclosure, the first time period may be determined based on the state history information requested by and transmitted to the SON server 200 in operation 501. The description of operation 403 of FIG. 4 may be identically or similarly applicable to operation 503.

In operation 505, the SON server 200 may determine a second time point based on the first time point and the first time period. The second time point may be understood as a reference time point at which the state of the access network is to be adjusted. The description of operation 405 of FIG. 4 may be identically or similarly applicable to operation 505.

In operation 507, the SON server 200 may request the access network device 300 to provide a state of the access network at a third time point. According to an embodiment of the disclosure, the third time point may be a time point between the first time point and the second time point, and the third time point may be at least one time point. In an embodiment of the disclosure, the third time point may be a time point temporally prior to a time point at which operation 509 is performed. According to an embodiment of the disclosure, a request message may be transmitted from the SON server 200 to the access network device 300, and the access network device 300 may transmit information about the state of the access network at the third time point to the SON server 200 in response to the request message. In an embodiment of the disclosure, in a case of a plurality of third time points, the access network device 300 may transmit information about a plurality of states of the access network to the SON server 200. According to an embodiment of the disclosure, operation 507 may be omitted. For example, the access network device 300 may transmit a state of the access network to the SON server 200 periodically according to a preset time interval, regardless of a request message. In this case, the SON server 200 may not request the access network device 300 to provide the state of the access network at the third time point.

In operation 509, the SON server 200 may estimate a state of the access network at the second time point. According to an embodiment of the disclosure, the SON server 200 may estimate the state of the access network at the second time point based on the state history information obtained in operation 501, and a first artificial intelligence learning model. The description of operation 407 of FIG. 4 may be identically or similarly applicable to operation 509.

According to an embodiment of the disclosure, the SON server 200 may estimate the state of the access network at the second time point, based on the state history information obtained in operation 501, the state of the access network at the third time point obtained in operation 507, and the first artificial intelligence learning model. Because the state of the access network at the third time point is information obtained at a time point temporally subsequent to the first time point at which the state history information is obtained, the SON server 200 may more accurately estimate the state of the access network at the second time point using the state of the access network at the third time point.

According to an embodiment of the disclosure, information about the state of the access network at the second time point estimated in operation 509, may be transmitted to the access network device 300.

In operation 510, the access network device 300 may obtain (e.g., receive), from the SON server 200, the state of the access network at the second time point estimated by the SON server 200, and may compare the estimated state of the access network at the second time point, with an actual state of the access network at the second time point. According to an embodiment of the disclosure, the access network device 300 may indicate a difference between the estimated state and the actual state using a separate parameter. For example, the access network device 300 may generate a vector indicating the difference between the estimated state and the actual state. In an embodiment of the disclosure, elements of the vector may be transformed into a magnitude, and the magnitude may be compared with a preset threshold value. In an embodiment of the disclosure, in a case where the magnitude is less than the preset threshold value, the estimated state may be determined to be reliable, whereas, in a case where the magnitude is greater than or equal to the preset threshold value, the estimated state may be determined to be unreliable.

In operation 511, the SON server 200 may determine values of the state control parameters for adjusting the state of the access network, based on the state of the access network at the second time point estimated in operation 509. According to an embodiment of the disclosure, the values of the state control parameters may be determined based on the estimated state of the access network at the second time point, and a second artificial intelligence learning model. The description of operation 409 of FIG. 4 may be identically or similarly applicable to operation 511.

According to an embodiment of the disclosure, the values of the state control parameters determined in operation 511 may be transmitted to the access network device 300.

In operation 512, the access network device 300 may apply the values of the state control parameters based on a result of comparing, in operation 510, the estimated state of the access network at the second time point, with the actual state of the access network at the second time point. In an embodiment of the disclosure, in a case where the estimated state has been determined to be reliable based on the result of the comparison in operation 510, the access network device 300 may apply, to a plurality of cells, the values of the state control parameters obtained from the SON server 200. In an embodiment of the disclosure, in a case where the estimated state has been determined to be unreliable based on the result of the comparison in operation 510, the access network device 300 may maintain existing values of the state control parameters, rather than applying the values of the state control parameters obtained from the SON server 200.

According to various embodiments of the disclosure, the order of operations 501 to 512 is not limited to that illustrated in FIG. 5. For example, although the information about the estimated state at the second time point as a result of operation 509 is illustrated to be transmitted from the SON server 200 to the access network device 300 prior to operations 510 and 511, the information about the estimated state at the second time point may be transmitted, after operation 511, to the access network device 300 with the determined values of the state control parameters. In this case, operation 510 may be performed after operation 511.

According to various embodiments of the disclosure, although not illustrated in FIG. 5, the SON server 200 may perform an operation of training the first artificial intelligence learning model and/or the second artificial intelligence learning model regardless of operations 501 to 512. For example, the SON server 200 may train the first artificial intelligence learning model and/or the second artificial intelligence learning model, between operations 501 to 512, before operation 501, or after operation 512. A method of training the first artificial intelligence learning model and the second artificial intelligence learning model will be described in greater detail below with reference to FIGS. 8 and 9.

Figure 6:
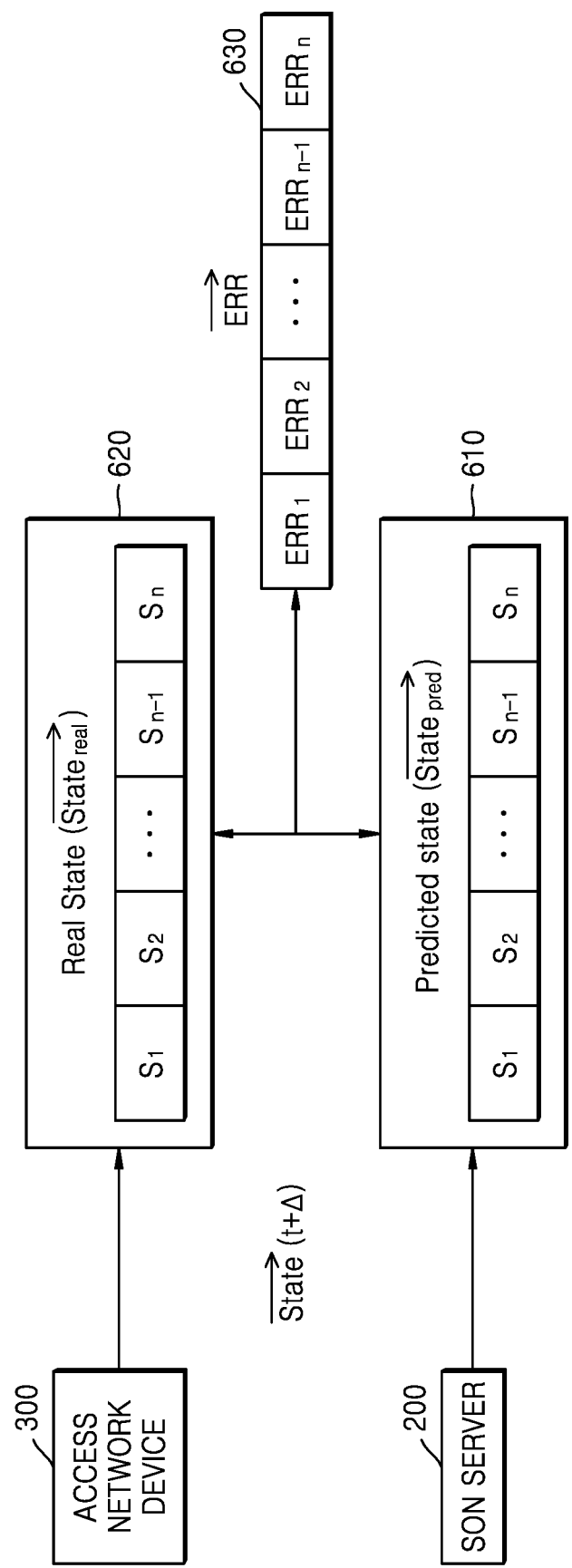
FIG. 6 is a diagram illustrating an example method of calculating a difference between an estimated state and an actual state with respect to an access network, according to various embodiments.

FIG. 6 is a diagram illustrating an example method of calculating a difference between an estimated state and an actual state with respect to an access network, according to various embodiments.

Referring to FIG. 6, a SON server 200 (e.g., the electronic device 200 of FIG. 2) may estimate a state of an access network at a time point t+Δ, and an access network device 300 may obtain an actual (e.g., real) state of the access network at the time point t+Δ. In an embodiment of the disclosure, t may be understood as the first time point described throughout the disclosure, Δ may be understood as the first time period described throughout the disclosure, and t+Δ may be understood as the second time point described throughout the disclosure.

According to an embodiment of the disclosure, an estimated state of the access network at the second time point may be represented by a vector $\overrightarrow{State_{pred}}$ 610, and an actual state of the access network at the second time point may be represented by a vector $\overrightarrow{State_{real}}$ 620. For example, the vector $\overrightarrow{State_{pred}}$ 610 and the vector $\overrightarrow{State_{real}}$ 620 may have the same number of elements, and the number n of the elements of each of the vector $\overrightarrow{State_{pred}}$ 610 and the vector $\overrightarrow{State_{real}}$ 620 may be based on the number of cells included in the access network device 300 and a number of elements of information about the state of the access network. For example, in a case where the access network device 300 includes four cells, and the information about the state of the access network includes two elements for each cell, which are a number of UEs currently connected to each cell, a proportion of radio resources allocated by each cell, the number n of the elements of each of the vector $\overrightarrow{State_{pred}}$ 610 and the vector $\overrightarrow{State_{real}}$ 620 may be eight. As another example, in a case where the access network device 300 includes six cells, and the information about the state of the access network includes only one element for each cell, which is the number of UEs currently connected to each cell, the number n of the elements of each of the vector $\overrightarrow{State_{pred}}$ 610 and the vector $\overrightarrow{State_{real}}$ 620 may be six.

The estimated state and the actual state of the access network at the second time point may be compared with each other to determine the reliability of a first artificial intelligence learning model that estimates the state of the access network at the second time point. For example, a vector $\overrightarrow{ERR}$ 630 may be calculated by calculating a difference between each pair of elements with the same index in the vector $\overrightarrow{State_{pred}}$ 610 and the vector $\overrightarrow{State_{real}}$ 620. In an embodiment of the disclosure, elements of the vector $\overrightarrow{ERR}$ 630 may be transformed into a magnitude, and the magnitude may be compared with a threshold value. For example, the magnitude of the vector $\overrightarrow{ERR}$ 630 may be represented by a mean square or a root mean square of the elements of the vector $\overrightarrow{ERR}$ 630, and may be compared with the threshold value.

Figure 7A:
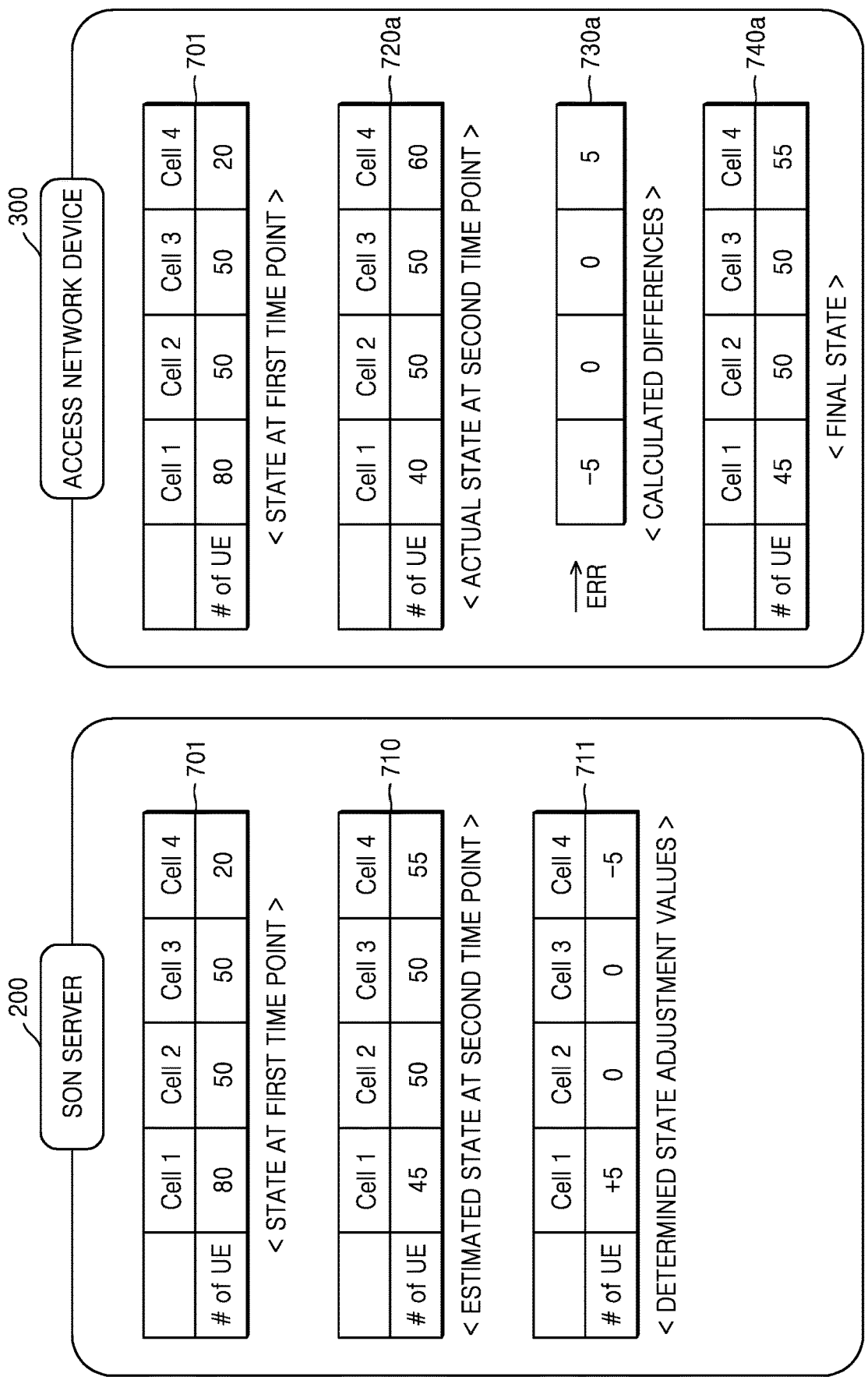
FIG. 7A is a diagram illustrating example adjustment of a state of an access network by a method of adjusting a state of an access network, according to various embodiments.

FIG. 7A is a diagram illustrating example adjustment of a state of an access network by a method of adjusting a state of an access network, according to various embodiments. FIG. 7B is a diagram illustrating example adjustment of a state of an access network by a method of adjusting a state of an access network, according to various embodiments.

Referring to FIGS. 7A and 7B, a SON server 200 and an access network device 300 may have information about a state of an access network at each time point. According to an embodiment of the disclosure, the information about the state of the access network at each time point may be transmitted from and to the SON server 200 and the access network device 300, and may be used to adjust a state of the access network.

According to various embodiments of the disclosure, the adjustment of the state of the access network illustrated in FIG. 7A or 7B is merely an example, and the method of adjusting a state of an access network is not limited to that illustrated in FIG. 7A or 7B. For example, although FIGS. 7A and 7B illustrate that the number of a plurality of cells is four, the number of plurality of cells is not limited thereto and may be any positive integer. As another example, although FIGS. 7A and 7B illustrate that a number of UEs currently connected to each cell is used for a state of the access network, a state of the access network may be represented using different types of variables, and thus the number of variables may be determined accordingly. For example, a state of the access network may include at least one of, with respect to each cell, a number of UEs currently connected to the cell, a physical resource block (PRB) utilization or usage, an internet protocol (IP) throughput, or a downlink (DL) data volume.

According to an embodiment of the disclosure, the access network device 300 may obtain a state 701 of the access network at a first time point, and the state 701 of the access network at the first time point may be transmitted to the SON server 200. According to an embodiment of the disclosure, at the first time point, a number of UEs connected to a first cell may be 80, a number of UEs connected to a second cell may be 50, a number of UEs connected to a third cell may be 50, and a number of UEs connected to a fourth cell may be 20.

According to an embodiment of the disclosure, the SON server 200 may estimate a state 710 of the access network at the second time point, based on the state 701 of the access network at the first time point. In an embodiment of the disclosure, the SON server 200 may estimate a number of UEs connected to the first cell at the second time point to be 45, estimate a number of UEs connected to the second cell at the second time point to be 50, estimate a number of UEs connected to the third cell at the second time point to be 50, and estimate a number of UEs connected to the fourth cell at the second time point to be 55.

According to an embodiment of the disclosure, the SON server 200 may determine values of state control parameters such that load balancing may be performed on the plurality of cells, based on the estimated state 710 of the access network at the second time point. In an embodiment of the disclosure, the SON server 200 may determine state adjustment values 711 for the cells based on the estimated state 710 of the access network at the second time point. The values of the state control parameters may be determined based on the state adjustment values 711 determined by the SON server 200. According to an embodiment of the disclosure, the SON server 200 may determine the value of the state control parameters to increase the number of UEs connected to the first cell by 5, and to decrease the number of UEs connected to the fourth cell by 5.

According to an embodiment of the disclosure, the SON server 200 may transmit, to the access network device 300, the values of the state control parameters determined according to the estimated state 710 of the access network at the second time point, and the state adjustment values 711.

In an embodiment of the disclosure, referring to FIG. 7A, the access network device 300 may obtain an actual state 720*a* of the access network state at the second time point. According to an embodiment of the disclosure, the access network device 300 may compare the estimated state 710 of the access network at the second time point, with the actual state 720*a* of the access network at the second time point, and may calculate a vector $\overrightarrow{ERR}$ 730*a* representing a difference therebetween. According to an embodiment of the disclosure, elements of the vector $\overrightarrow{ERR}$ 730*a* representing the difference between the estimated state 710 and the actual state 720*a* may be transformed into a magnitude, and the magnitude may be compared with a threshold value. For example, the magnitude of the vector $\overrightarrow{ERR}$ 730*a* may be a root mean square of the elements of the vector $\overrightarrow{ERR}$ 730*a*, and the threshold value may be set to be, for example, 5. In this case, the root mean square of the elements of the vector $\overrightarrow{ERR}$730*a* may be $$\frac{5\sqrt{2}}{2},$$

and may be determined to be lower than the threshold value which is 5. In an embodiment of the disclosure, in a case where the magnitude of the vector $\overrightarrow{ERR}$ 730*a* is less than the threshold value, the access network device 300 may determine that information obtained from the SON server 200 is reliable. The access network device 300 may apply the values of the state control parameters obtained from the SON server 200, thereby adjusting the number of UEs connected to each cell. In an embodiment of the disclosure, a final state of the access network 740*a* may be changed by adjusting the state of the access network 720*a* at the second time point. For example, the number of UEs connected to the first cell may be adjusted from 40 to 45, and the number of UEs connected to the fourth cell may be adjusted from 60 to 55.

In an embodiment of the disclosure, referring to FIG. 7B, the access network device 300 may obtain an actual state 720*b* of the access network at the second time point. According to an embodiment of the disclosure, the access network device 300 may compare the estimated state 710 of the access network at the second time point, with the actual state 720*b* of the access network at the second time point, and may calculate a vector $\overrightarrow{ERR}$ 730*b* representing a difference therebetween. According to an embodiment of the disclosure, elements of the vector $\overrightarrow{ERR}$ 730*b* representing the difference between the estimated state 710 and the actual state 720*b* may be transformed into a magnitude, and the magnitude may be compared with the threshold value. For example, the magnitude of the vector $\overrightarrow{ERR}$ 730*b* may be a root mean square of the elements of the vector $\overrightarrow{ERR}$ 730*b*, and the threshold value may be set to be, for example, 5. In this case, the root mean square of the elements of the vector $\overrightarrow{ERR}$ 730*b* may be $$\frac{15\sqrt{2}}{2},$$

and may be determined to be greater than the threshold value which is 5. In an embodiment of the disclosure, in a case where the magnitude of the vector $\overrightarrow{ERR}$ 730*b* is greater than the threshold value, the access network device 300 may determine that information obtained from the SON server 200 is unreliable. Accordingly, the access network device 300 may not apply the values of the state control parameters obtained from the SON server 200, and the number of UEs connected to each cell may be maintained in a final state of the access network 740*b*. In this case, the access network device 300 may transmit a message for requesting the SON server 200 to provide new values of the state control parameters.

Figure 8:
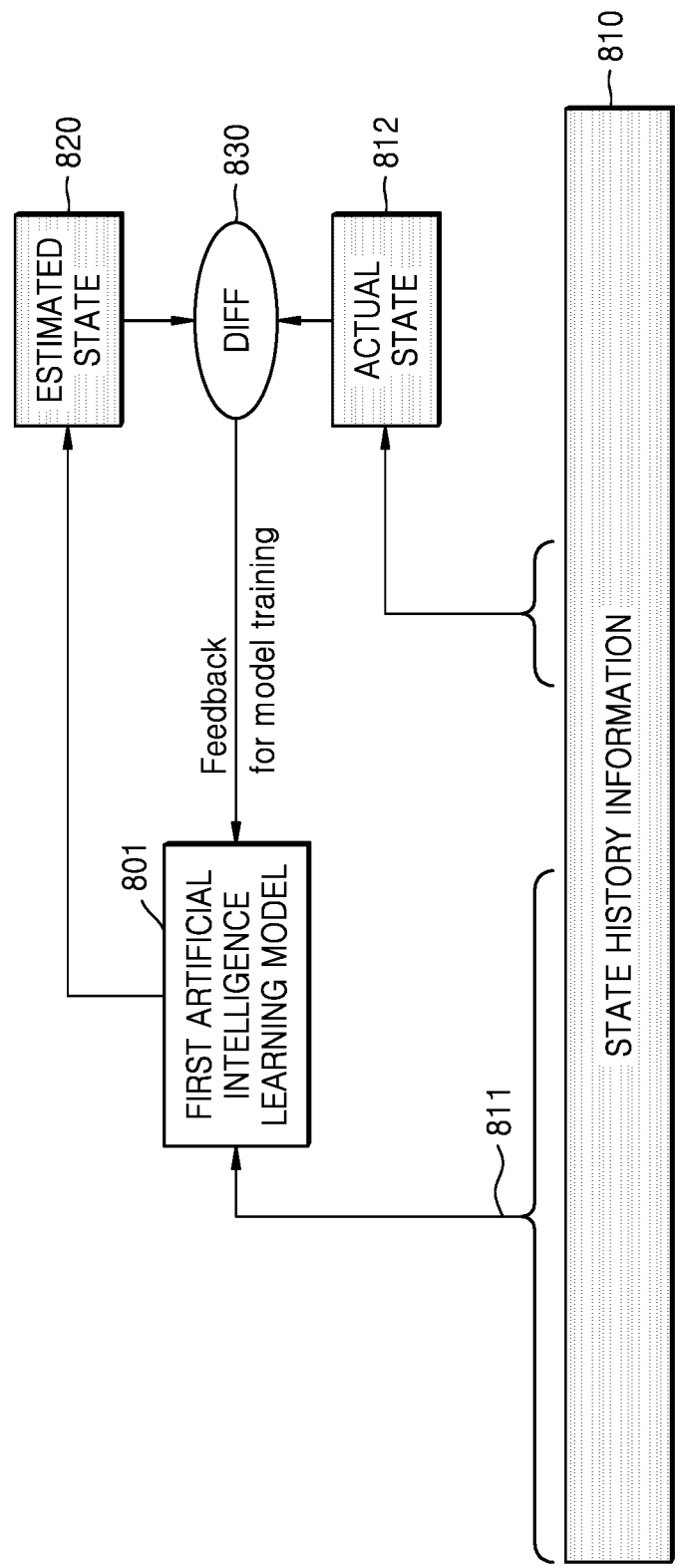
FIG. 8 is a diagram illustrating an example method of training a first artificial intelligence learning model, according to various embodiments.

FIG. 8 is a diagram illustrating an example method of training a first artificial intelligence learning model, according to various embodiments.

According to an embodiment of the disclosure, a first artificial intelligence learning model 801 may use, as an input, at least a portion of state history information 810. According to various embodiments of the disclosure, the state history information 810 being input to the first artificial intelligence learning model 801 may include state history information containing states of an access network obtained during a preset time period, for example, a week, and/or information about states of the access network under a predefined condition obtained during a preset time period, for example, state history information containing states of the access network at a certain day of the week or at a preset time point, obtained during a last month. According to an embodiment of the disclosure, the state history information being input to the first artificial intelligence learning model 801 may include state history information containing states of the access network, according to a certain event, for example, an occasion, a gathering, or a holiday.

According to an embodiment of the disclosure, the first artificial intelligence learning model 801 may be repeatedly trained and tested by receiving various pieces of state history information 810 as inputs. For example, the first artificial intelligence learning model 801 may estimate, using information 811 about states of the access network for a certain time period extracted from the state history information 810, a state of the access network at a preset time point temporally subsequent to the certain time period. The first artificial intelligence learning model 801 may obtain an actual state 812 of the access network at the preset time point, from the state history information 810. The first artificial intelligence learning model 801 may be tested by comparing an estimated state 820 with the obtained actual state 812. A comparison result (e.g., DIFF) 830 may be used as a feedback, and accordingly, the first artificial intelligence learning model 801 may be trained. The first artificial intelligence learning model 801 may be trained by repeating an operation of estimating and testing states of the access network at various time points using various time periods and their corresponding states in the state history information 810.

Figure 9:
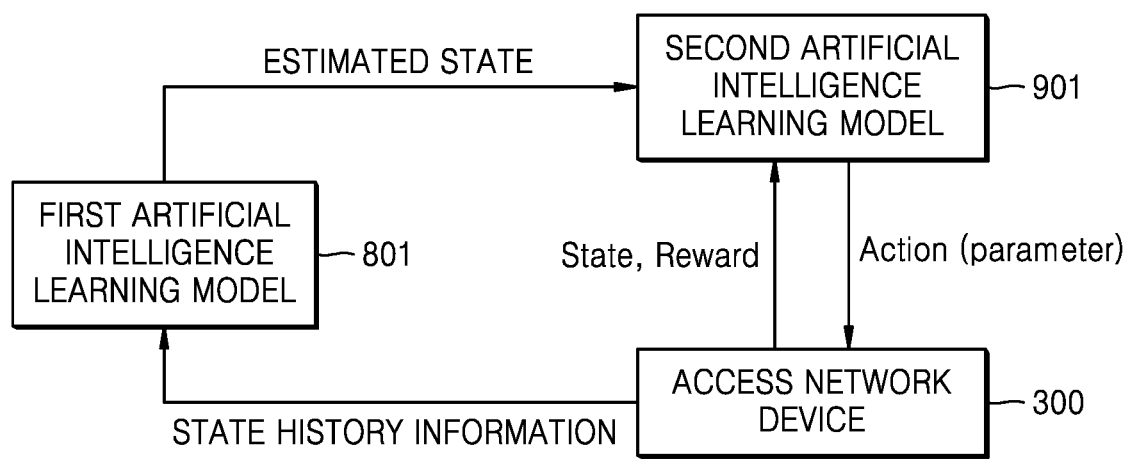
FIG. 9 is a diagram illustrating an example method of training a first artificial intelligence learning model and a second artificial intelligence learning model, according to various embodiments.

FIG. 9 is a diagram illustrating an example method of training a first artificial intelligence learning model and a second artificial intelligence learning model, according to various embodiments.

According to an embodiment of the disclosure, as described above with reference to FIG. 8, the first artificial intelligence learning model 801 may be trained by obtaining the state history information from the access network device 300, and estimating a state of the access network. For example, the first artificial intelligence learning model 801 may be trained by estimating a state of an access network at a certain time point using a portion of the state history information, and comparing the estimated state with an actual state of the access network at the certain time point in the state history information.

According to an embodiment of the disclosure, the state of the access network estimated by the first artificial intelligence learning model 801 may be input as a state variable to a second artificial intelligence learning model 901, and thus may be used for training the second artificial intelligence learning model 901. According to an embodiment of the disclosure, the second artificial intelligence learning model 901 may determine values of the state control parameters for adjusting the estimated state, as an action variable, based on the state of the access network at the certain time point estimated by the first artificial intelligence learning model 801. The second artificial intelligence learning model 901 may calculate a reward variable by obtaining, from the access network device 300, a state of the access network at a time point temporally subsequent to the certain time point. The reward variable may include, for example, an amount of loads distributed or an amount of reduced power, after performing adjustment on the state of the access network. In an embodiment of the disclosure, the second artificial intelligence learning model 901 may determine values of the state control parameters such that the reward variable is to be increased, preferably, maximized, and may be trained by repeating the above process.

According to an example embodiment of the disclosure, a method, performed by an electronic device, of adjusting a state of an access network including at least one cell may include: obtaining state history information of the access network at a first time point, determining, based on the obtained state history information, a first time period required to adjust a state of the access network, determining, based on the first time point and the first time period, a second time point, the second time point being a reference time point at which the state of the access network is to be adjusted, estimating a state of the access network at the second time point based on the obtained state history information, determining, based on the estimated state of the access network at the second time point, values of state control parameters for adjusting the state of the access network, and transmitting the determined values of the state control parameters to the access network, wherein the values of the state control parameters transmitted to the access network are to be applied, at the second time point, to the state control parameters of the access network, to adjust the state of the access network.

According to an example embodiment of the disclosure, the method may further include obtaining a state of the access network at a third time point between the first time point and the second time point, and the estimating of the state of the access network at the second time point may be performed by estimating the state of the access network at the second time point based on the obtained state history information, and the obtained state of the access network at the third time point.

According to an example embodiment of the disclosure, the state history information may correspond to first state history information, the method may further include: obtaining second state history information of the access network at a fourth time point temporally prior to the first time point, and estimating a state of the access network at at least one third time point between the first time point and the second time point, based on the second state history information, and the estimating of the state of the access network at the second time point may be performed by estimating the state of the access network at the second time point based on the obtained first state history information and the estimated state of the access network at the third time point.

According to an example embodiment of the disclosure, the method may further include: determining, based on the estimated state of the access network at the third time point, values of the state control parameters for adjusting a state of the access network at the third time point, and estimating, based on the estimated state of the access network at the third time point, and the determined values of the state control parameters for adjusting the state of the access network at the third time point, a state of the access network based on the adjustment at the third time point, wherein the estimating of the state of the access network at the second time point may be performed by estimating the state of the access network at the second time point, based on the obtained first state history information and the estimated state of the access network based on the adjustment at the third time point.

According to an example embodiment of the disclosure, the determining of the values of the state control parameters may be performed by determining the values of the state control parameters, during a time period between the first time point and the second time point.

According to an example embodiment of the disclosure, the method may further include: transmitting, to the access network, information about the estimated state of the access network at the second time point, comparing, by the access network, the estimated state of the access network at the second time point, with an actual state of the access network at the second time point, and applying, at the second time point, the values of the state control parameters to the state control parameters of the access network, based on a result of the comparison.

According to an example embodiment of the disclosure, the method may further include: calculating an error value, the error value being a difference between the estimated state of the access network at the second time point and the actual state of the access network at the second time point, wherein the applying of the values of the state control parameters may be performed by applying, based on the calculated error value being less than a preset threshold value, at the second time point, the values of the state control parameters to the state control parameters of the access network.

According to an example embodiment of the disclosure, the state of the access network may include at least one of, with respect to the at least one cell, a number of UEs currently connected to the cell, a physical resource block (PRB) utilization or usage, an internet protocol (IP) throughput, or a downlink (DL) data volume.

According to an example embodiment of the disclosure, the estimating of the state of the access network at the second time point may be performed using a first artificial intelligence learning model, the determining of the values of the state control parameters may be performed using a second artificial intelligence learning model, and each of the first and second artificial intelligence learning models may be trained by at least one of reinforcement learning, supervised learning, machine learning, continual learning, federated learning, or deep learning.

According to an example embodiment of the disclosure, the determining of the values of the state control parameters may be performed by determining the values of the state control parameters for load balancing on each of the at least one cell in the access network.

According to an example embodiment of the disclosure, the determining of the values of the state control parameters may be performed by determining the values of the state control parameters for adjustment of power consumed by each of the at least one cell in the access network.

According to an example embodiment of the disclosure, the method may further include: obtaining a state of the access network at the second time point, wherein the first artificial intelligence learning model may be trained based on the state history information, the estimated state of the access network at the second time point, and the obtained state of the access network at the second time point.

According to an example embodiment of the disclosure, the method may further include: obtaining a state of the access network at a fourth time point temporally subsequent to the second time point, wherein the second artificial intelligence learning model may be trained based on the estimated state of the access network at the second time point, the determined values of the state control parameters, and the obtained state of the access network at the fourth time point.

According to an example embodiment of the disclosure, the state control parameters may include at least one of a reference signal received power (RSRP) threshold value, a reference signal received quality (RSRQ) threshold value, a physical radio block (PRB) proportion threshold value, or a cell re-selection priority.

According to an example embodiment of the disclosure, an electronic device configured to adjust a state of an access network including at least one cell may include: at least one processor, and a memory connected to the at least one processor, wherein the at least one processor may be configured to control the electronic device to: obtain state history information of the access network at a first time point, determine, based on the obtained state history information, a first time period required to adjust a state of the access network, determine, based on the first time point and the first time period, a second time point, the second time point being a reference time point at which the state of the access network is to be adjusted, estimate a state of the access network at the second time point based on the obtained state history information, determine values of state control parameters for adjusting the state of the access network, based on the estimated state of the access network at the second time point, and transmit the determined values of the state control parameters to the access network, wherein the values of the state control parameters transmitted to the access network are to be applied, at the second time point, to the state control parameters of the access network, to adjust the state of the access network.

According to an example embodiment of the disclosure, the at least one processor may be further configured to control the electronic device to: obtain a state of the access network at a third time point between the first time point and the second time point, and estimate the state of the access network at the second time point based on the obtained state history information, and the obtained state of the access network at the third time point.

According to an example embodiment of the disclosure, the state history information may correspond to first state history information, and the at least one processor may be further configured to control the electronic device to: obtain second state history information of the access network at a fourth time point temporally prior to the first time point, estimate a state of the access network at at least one third time point between the first time point and the second time point, based on the second state history information, and estimate the state of the access network at the second time point based on the obtained first state history information, and the estimated state of the access network at the third time point.

According to an example embodiment of the disclosure, the at least one processor may be further configured to: determine, based on the estimated state of the access network at the third time point, values of the state control parameters for adjusting a state of the access network at the third time point, estimate, based on the estimated state of the access network at the third time point, and the determined values of the state control parameters for adjusting the state of the access network at the third time point, a state of the access network after the adjustment at the third time point, and estimate the state of the access network at the second time point, based on the obtained first state history information and the estimated state of the access network after the adjustment at the third time point.

According to an example embodiment of the disclosure, the at least one processor may be further configured to: determine the values of the state control parameters, during a time period between the first time point and the second time point.

According to an example embodiment of the disclosure, the at least one processor may be further configured to control the electronic device to: transmit, to the access network, information about the estimated state of the access network at the second time point, the access network may compare the estimated state of the access network at the second time point, with an actual state of the access network at the second time point, and, at the second time point, the values of the state control parameters may be applied to the state control parameters of the access network, based on a result of the comparison.

According to an example embodiment of the disclosure, an error value which is a difference between the estimated state of the access network at the second time point and the actual state of the access network at the second time point may be calculated, and, based on the calculated error value being less than a preset threshold value, at the second time point, the values of the state control parameters may be applied to the state control parameters of the access network.

According to an example embodiment of the disclosure, the state of the access network may include at least one of, with respect to the at least one cell, a number of UEs currently connected to the cell, a physical resource block (PRB) utilization or usage, an internet protocol (IP) throughput, or a downlink (DL) data volume.

According to an example embodiment of the disclosure, the state of the access network at the second time point may be estimated using a first artificial intelligence learning model, the values of the state control parameters may be determined using a second artificial intelligence learning model, and each of the first and second artificial intelligence learning models may be trained by at least one of reinforcement learning, supervised learning, machine learning, continual learning, federated learning, or deep learning.

According to an example embodiment of the disclosure, the at least one processor may be further configured to control the electronic device to: obtain a state of the access network at the second time point, and the first artificial intelligence learning model may be trained based on the state history information, the estimated state of the access network at the second time point, and the obtained state of the access network at the second time point.

According to an example embodiment of the disclosure, the at least one processor may be further configured to control the electronic device to: obtain a state of the access network at a fourth time point temporally subsequent to the second time point, and the second artificial intelligence learning model may be trained based on the estimated state of the access network at the second time point, the determined values of the state control parameters, and the obtained state of the access network at the fourth time point.

According to an example embodiment of the disclosure, the state control parameters may include at least one of a reference signal received power (RSRP) threshold value, a reference signal received quality (RSRQ) threshold value, a physical radio block (PRB) proportion threshold value, or a cell re-selection priority.

Various embodiments and terms used therefor of the disclosure are not for limiting the technologies disclosed in the disclosure to a specific embodiment, and they should be interpreted to include all modifications, equivalents and/or alternatives of the embodiments of the disclosure. In relation to explanation of the drawings, similar reference numerals may be used for similar elements. The singular expression also includes the plural meaning as long as it does not inconsistent with the context. In this disclosure, expressions such as "A or B", "at least one of A and/or B", "A, B or C", or "at least one of A, B and/or C" include all possible combinations of the listed items. The expressions "first", "second", and the like used in the disclosure may denote corresponding elements, regardless of order and/or importance, and may be used to distinguish one element from another, but does not limit the elements. When it is described that a certain element (e.g., first element) is "operatively or communicatively coupled with/to" or is "connected to" another element (e.g., second element), it should be understood that the certain element may be connected to the other element directly or through still another element (e.g., third element).

The term "module" used in the disclosure may include units embodied as hardware, software, or firmware, or any combination thereof, and may be used compatibly with terms such as, for example, logics, logic blocks, components, circuits, or the like. The "module" may be an integrally configured component or a minimum unit performing one or more functions or a part thereof. For example, the module may be embodied as an application-specific integrated circuit (ASIC).

Various embodiments of the disclosure may be embodied as software including instructions stored on machine-readable storage media (e.g., an internal memory or external memory) readable by a machine (e.g., a computer). The machine may be a device that calls instructions stored in a storage medium and is operable according to the called instructions, including an electronic device according to the disclosed embodiments. When the instructions are executed by a processor, the processor may perform the function corresponding to the instructions, either directly, or using other components under the control by the processor. The instructions may include code generated by a compiler or a code executable by an interpreter. The machine-readable storage medium may be provided in the form of a non-transitory storage medium. The 'non-transitory' storage medium does not refer to a transitory electrical signal but is tangible, and does not distinguish whether data is stored semi-permanently or temporarily on the storage medium.

According to an embodiment of the disclosure, the method according to various embodiments disclosed herein may be provided in a computer program product. A computer program product may be traded between a seller and a purchaser as a commodity. A computer program product may be distributed in the form of a machine-readable storage medium (e.g., compact disc read only memory (CD-ROM)) or distributed online through an application store (e.g., Google Play™). In a case of on-line distribution, at least a portion of the computer program product may be temporarily stored, or temporarily created, on a storage medium such as a manufacturer's server, a server of an application store, or a memory of a relay server.

Each of the elements (e.g., modules or programs) according to various embodiments of the disclosure may include a single entity or a plurality of entities, and some subelements of the abovementioned subelements may be omitted, or other elements may be further included in various embodiments. Alternatively or additionally, some elements (e.g., modules or programs) may be integrated into one entity to perform the same or similar functions performed by each element prior to integration. Operations performed by modules, programs, or other elements, according to various embodiments of the disclosure, may be executed sequentially, in parallel, repetitively, or heuristically, or at least some operations may be performed in a different order, or omitted, or another operation may be further added.

A function related to an artificial intelligence according to the disclosure may operate via a processor and a memory. The processor may include one or more processors. In this case, the one or more processors may include, for example, a general-purpose processor such as a central processing unit (CPU), an application processor (AP), or a digital signal processor (DSP), a dedicated graphics processor such as a graphics processing unit (GPU), a vision processing unit (VPU), or a dedicated AI processor such as a neural processing unit (NPU). The one or more processors may control input data to be processed according to predefined operation rules or an artificial intelligence model stored in the memory. When the one or more processors are dedicated artificial intelligence processors, the dedicated artificial intelligence processor may be designed with a hardware structure specialized for processing a specific artificial intelligence model.

The predefined operation rules or artificial intelligence model may be generated through a training process. This may refer, for example, to the predefined operation rules or artificial intelligence model set to perform according to desired characteristics (or purposes) being generated by training a basic artificial intelligence model with a learning algorithm that utilizes a large number of training data. The training process may be performed by a device for performing artificial intelligence or a separate server and/or system. Examples of the learning algorithm may include, for example, and without limitation, supervised learning, unsupervised learning, semi-supervised learning, reinforcement learning, or the like, but are not limited thereto.

The artificial intelligence model may include a plurality of neural network layers. Each of the neural network layers may include a plurality of weight values, and may perform a neural network arithmetic operation through an arithmetic operation between an arithmetic operation result of a previous layer and the plurality of weight values. The plurality of weight values in each of the neural network layers may be optimized by a result of training the artificial intelligence model. For example, the plurality of weight values may be refined to reduce or minimize a loss or cost value obtained by the artificial intelligence model during the training process. An artificial neural network may include, for example, a deep neural network (DNN) and may include, for example, a convolutional neural network (CNN), a deep neural network (DNN), a recurrent neural network (RNN), a restricted Boltzmann machine (RBM), a deep belief network (DBN), a bidirectional recurrent deep neural network (BRDNN), deep Q-networks (DQN), or the like, but is not limited thereto.

In the method by which an electronic device adjusts a state of an access network including at least one cell according to the disclosure, an artificial intelligence model may be used to optimize a state of the access network at a second time point or values of state control parameters, using state history information of the access network, for inferring or estimating a state of the access network or the state control parameters. The processor may preprocess the data to transform the data into a form appropriate to be used as an input to an artificial intelligence model. The artificial intelligence model may be generated by a training process. This may refer, for example, to the predefined operation rules or artificial intelligence model set to perform according to desired characteristics (or purposes) being generated by training a basic artificial intelligence model with a learning algorithm that utilizes a large number of training data. The artificial intelligence model may include a plurality of neural network layers. Each of the neural network layers may include a plurality of weight values, and may perform a neural network arithmetic operation through an arithmetic operation between an arithmetic operation result of a previous layer and the plurality of weight values.

Inference/prediction may refer to technology for judging information for logical inference and prediction, and includes knowledge/probability-based reasoning, optimization prediction, preference-based planning, recommendation, or the like.

According to embodiments of the disclosure, an influence due to changes in a state of an access network, which may be caused by a time difference between a time point of collecting data from access network devices and a time point of determining an optimal configuration, may be reduced. Accordingly, the reliability of the determined configuration may be improved, and a load balancing effect or a power consumption reducing effect for the access network devices may be improved.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents.

What is claimed is:

1. A method, performed by an electronic device, of adjusting a state of an access network including at least one cell, the method comprising:
   obtaining state history information of the access network at a first time point;
   determining, based on the obtained state history information, a first time period required to adjust a state of the access network;
   determining, based on the first time point and the first time period, a second time point, the second time point being a reference time point at which the state of the access network is to be adjusted;
   estimating a state of the access network at the second time point based on the obtained state history information;
   determining, based on the estimated state of the access network at the second time point, values of state control parameters for adjusting the state of the access network; and
   transmitting the determined values of the state control parameters to the access network,
   wherein the values of the state control parameters transmitted to the access network are applied, at the second time point, to the state control parameters of the access network, to adjust the state of the access network.

2. The method of claim 1, further comprising: obtaining a state of the access network at a third time point between the first time point and the second time point, and
   the estimating of the state of the access network at the second time point is performed by estimating the state of the access network at the second time point based on the obtained state history information, and the obtained state of the access network at the third time point.

3. The method of claim 1, wherein the state history information corresponds to first state history information, and
   the method further comprises: obtaining second state history information of the access network at a fourth time point temporally prior to the first time point; and
   estimating a state of the access network at at least one third time point between the first time point and the second time point, based on the second state history information, and
   wherein the estimating of the state of the access network at the second time point is performed by estimating the state of the access network at the second time point based on the obtained first state history information and the estimated state of the access network at the third time point.

4. The method of claim 3, further comprising:
   determining, based on the estimated state of the access network at the third time point, values of the state control parameters for adjusting a state of the access network at the third time point; and
   estimating, based on the estimated state of the access network at the third time point, and the determined values of the state control parameters for adjusting the state of the access network at the third time point, a state of the access network based on the adjustment at the third time point,
wherein the estimating of the state of the access network at the second time point is performed by estimating the state of the access network at the second time point, based on the obtained first state history information and the estimated state of the access network based on the adjustment at the third time point.

5. The method of claim 1, wherein the determining of the values of the state control parameters is performed by determining the values of the state control parameters, during a time period between the first time point and the second time point.

6. The method of claim 5, further comprising:
transmitting, to the access network, information about the estimated state of the access network at the second time point;
comparing, by the access network, the estimated state of the access network at the second time point, with an actual state of the access network at the second time point; and
applying, at the second time point, the values of the state control parameters to the state control parameters of the access network, based on a result of the comparing.

7. The method of claim 6, further comprising: calculating, as an error value, a difference between the estimated state of the access network at the second time point and the actual state of the access network at the second time point,
wherein, based on the calculated error value being less than a preset threshold value, the applying of the values of the state control parameters comprises applying, at the second time point, the values of the state control parameters to the state control parameters of the access network.

8. The method of claim 1, wherein the state of the access network includes at least one of, with respect to each of the at least one cell, a number of user equipments (UEs) currently connected to the cell, a physical resource block (PRB) utilization or usage, an internet protocol (IP) throughput, or a downlink (DL) data volume.

9. The method of claim 1, wherein the state of the access network at the second time point is estimated using a first artificial intelligence learning model,
the values of the state control parameters are determined using a second artificial intelligence learning model, and
each of the first and second artificial intelligence learning models is trained by at least one of reinforcement learning, supervised learning, machine learning, continual learning, federated learning, or deep learning.

10. The method of claim 1, wherein the determining of the values of the state control parameters is performed by determining the values of the state control parameters for load balancing on each of the at least one cell in the access network.

11. The method of claim 1, wherein the determining of the values of the state control parameters is performed by determining the values of the state control parameters for adjustment of power consumed by each of the at least one cell in the access network.

12. The method of claim 9, further comprising obtaining a state of the access network at the second time point,
wherein the first artificial intelligence learning model is trained based on the state history information, the estimated state of the access network at the second time point, and the obtained state of the access network at the second time point.

13. The method of claim 9, further comprising: obtaining a state of the access network at a fourth time point temporally subsequent to the second time point,
wherein the second artificial intelligence learning model is trained based on the estimated state of the access network at the second time point, the determined values of the state control parameters, and the obtained state of the access network at the fourth time point.

14. The method of claim 1, wherein the state control parameters include at least one of a reference signal received power (RSRP) threshold value, a reference signal received quality (RSRQ) threshold value, a physical radio block (PRB) proportion threshold value, or a cell re-selection priority.

15. An electronic device configured to adjust a state of an access network including at least one cell, the electronic device comprising:
at least one processor; and
a memory connected to the at least one processor,
wherein the at least one processor is configured to control the electronic device to:
obtain state history information of the access network at a first time point,
determine, based on the obtained state history information, a first time period required to adjust a state of the access network,
determine, based on the first time point and the first time period, a second time point, the second time point being a reference time point at which the state of the access network is to be adjusted,
estimate a state of the access network at the second time point based on the obtained state history information,
determine values of state control parameters for adjusting the state of the access network, based on the estimated state of the access network at the second time point, and
transmit the determined values of the state control parameters to the access network,
wherein the values of the state control parameters transmitted to the access network are applied, at the second time point, to the state control parameters of the access network, to adjust the state of the access network.

16. The electronic device of claim 15, wherein the at least one processor is further configured to control the electronic device to:
obtain a state of the access network at a third time point between the first time point and the second time point, and
estimate the state of the access network at the second time point based on the obtained state history information, and the obtained state of the access network at the third time point.

17. The electronic device of claim 15, wherein the state history information corresponds to first state history information, and
the at least one processor is further configured to control the electronic device to:
obtain second state history information of the access network at a fourth time point temporally prior to the first time point,
estimate a state of the access network at at least one third time point between the first time point and the second time point, based on the second state history information, and estimate the state of the access network at the second time point based on the obtained first state history information, and the estimated state of the access network at the third time point.

18. The electronic device of claim 17, wherein the at least one processor is further configured to control the electronic device to:

determine, based on the estimated state of the access network at the third time point, values of the state control parameters for adjusting a state of the access network at the third time point, estimate, based on the estimated state of the access network at the third time point, and the determined values of the state control parameters for adjusting the state of the access network at the third time point, a state of the access network based on the adjustment at the third time point, and estimate the state of the access network at the second time point, based on the obtained first state history information and the estimated state of the access network based on the adjustment at the third time point.

19. The electronic device of claim 15, wherein the state of the access network at the second time point is estimated using a first artificial intelligence learning model, the values of the state control parameters are determined using a second artificial intelligence learning model, and each of the first and second artificial intelligence learning models is trained by at least one of reinforcement learning, supervised learning, machine learning, continual learning, federated learning, or deep learning.

20. The electronic device of claim 15, wherein the state control parameters include at least one of a reference signal received power (RSRP) threshold value, a reference signal received quality (RSRQ) threshold value, a physical radio block (PRB) proportion threshold value, or a cell re-selection priority.

* * * * *